(12) United States Patent
Bruce

(10) Patent No.: US 7,878,262 B1
(45) Date of Patent: Feb. 1, 2011

(54) NOTCHED COULTER/DISC AND METHOD OF MAKING SAME

(76) Inventor: Douglas G Bruce, 2223 Fourth St., Perry, IA (US) 50220

( * ) Notice: Subject to any disclaimer, the term of this patent is extended or adjusted under 35 U.S.C. 154(b) by 18 days.

(21) Appl. No.: 12/500,410

(22) Filed: Jul. 9, 2009

(51) Int. Cl.
*A01B 15/10* (2006.01)
(52) U.S. Cl. ..................... 172/604; 172/765
(58) Field of Classification Search .......... 172/753, 172/762, 769, 766, 765, 772.5, 772, 535, 172/538, 556, 540, 604, 681; 111/190–193, 111/195, 139–149, 164–169, 52, 62, 83
See application file for complete search history.

(56) References Cited

U.S. PATENT DOCUMENTS

| | | | |
|---|---|---|---|
| 4,099,576 A * | 7/1978 | Jilani | 172/555 |
| 5,620,055 A * | 4/1997 | Javerlhac | 172/604 |
| 5,855,246 A * | 1/1999 | Bruce | 172/604 |
| 6,554,079 B2 | 4/2003 | Bruce | |
| 7,104,206 B2 | 9/2006 | Jones | |
| 7,143,704 B1 | 12/2006 | Gust | |
| 7,143,838 B2 | 12/2006 | Piccat | |
| 7,222,575 B2 | 5/2007 | Bassett | |
| 7,240,627 B1 | 7/2007 | Whalen | |
| 7,497,270 B2 | 3/2009 | Bruce | |
| 7,757,777 B1 * | 7/2010 | Wipf et al. | 172/604 |

* cited by examiner

*Primary Examiner*—Robert E Pezzuto
(74) *Attorney, Agent, or Firm*—Sturm & Fix LLP

(57) ABSTRACT

A coulter or disc having a plurality of directional notches therein is used in one rotational direction for one use and an opposite rotational direction for a different use. The notches are selected from many arcuate shapes and sizes. The notches taper from sharp to dull from one end to the other, but in use one can chose to lead with the dull or the sharp end of the notches. A method of making and using such coulters or discs is described and shown.

4 Claims, 26 Drawing Sheets

SET-UP LOCATIONS
FOR SUPPORT PIN

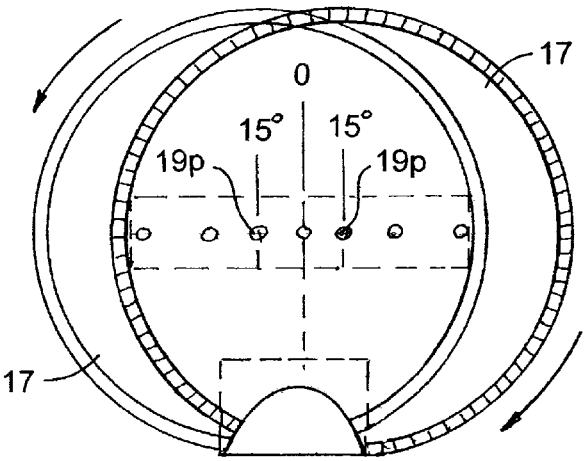
*Fig. 1A* — 15° CUT CLOCKWISE AND COUNTER CLOCKWISE
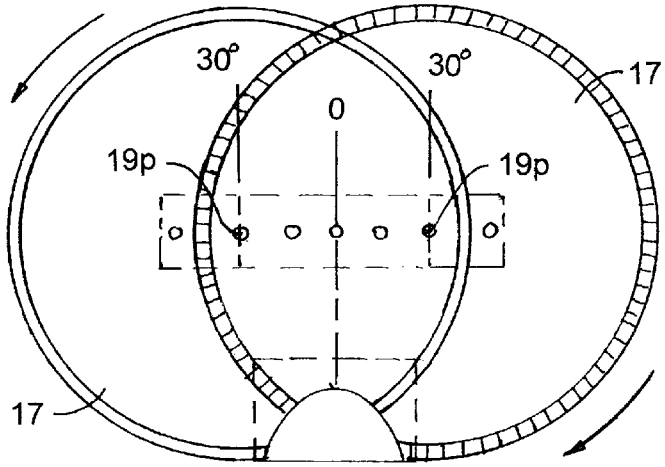
*Fig. 1B* — 30° CUT CLOCKWISE AND COUNTER CLOCKWISE
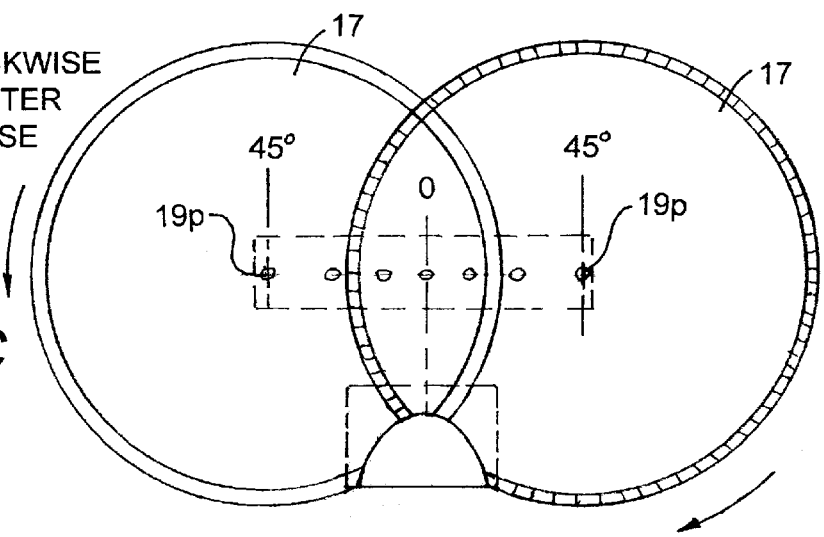
*Fig. 1C* — 45° CUT CLOCKWISE AND COUNTER CLOCKWISE

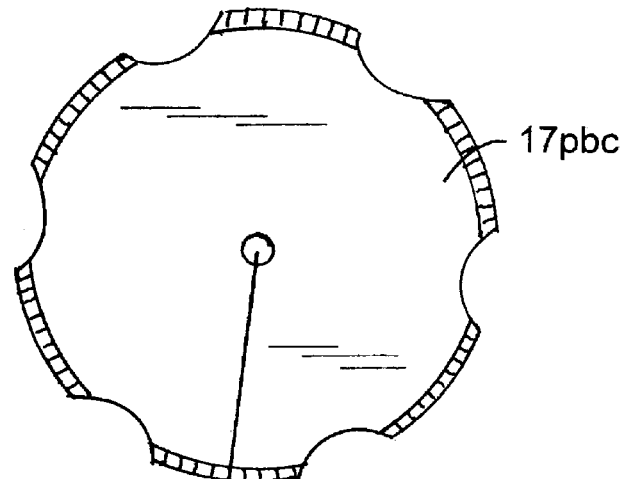
PATTERN DISC
30° CUT CLOCKWISE
*Fig. 6*
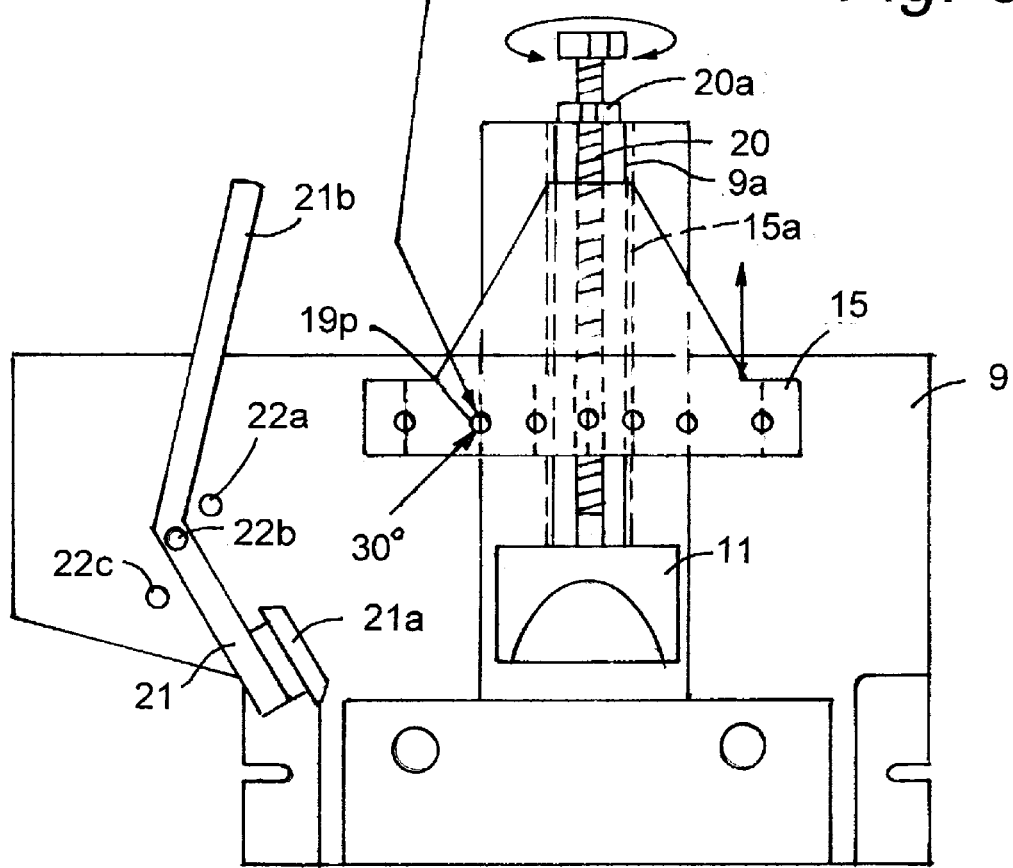

Move disc down
And rotate until
Point A on disc
Is at Point B
on die.

BLANK DISC
READY TO CUT

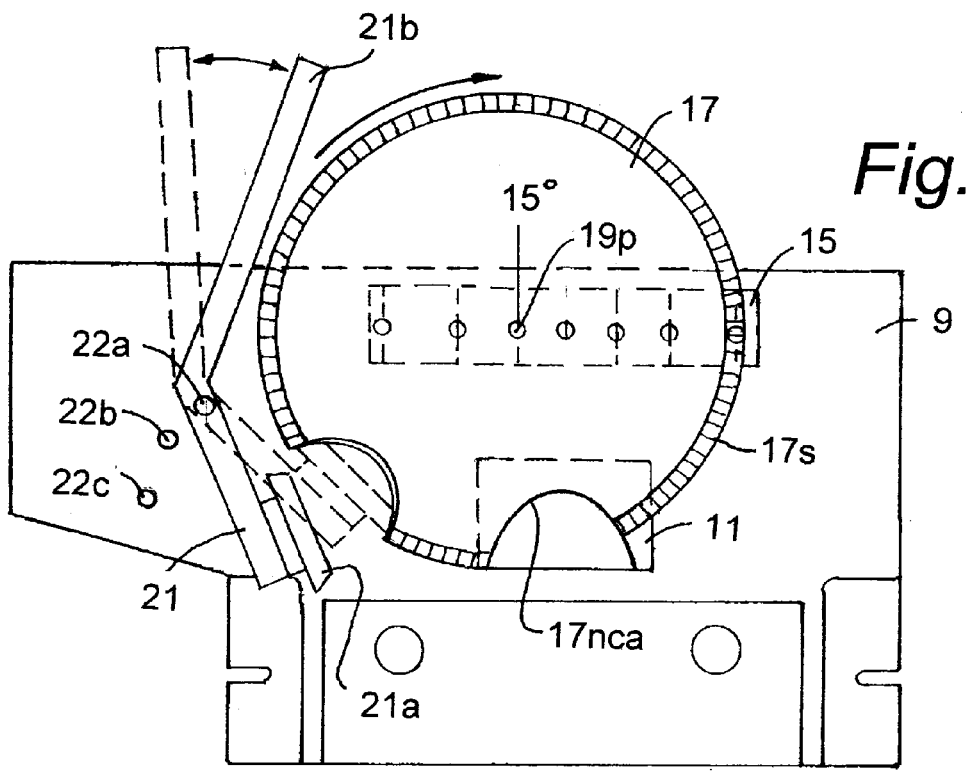
Fig. 11
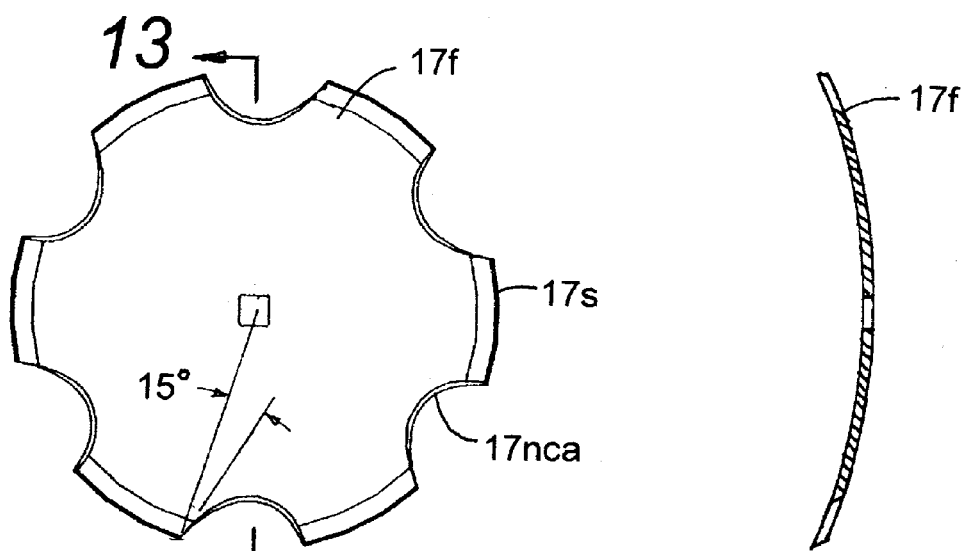
Fig. 12
Fig. 13

PATTERN DISC

30° CUT COUNTER CLOCKWISE

BLANK DISC READY TO CUT

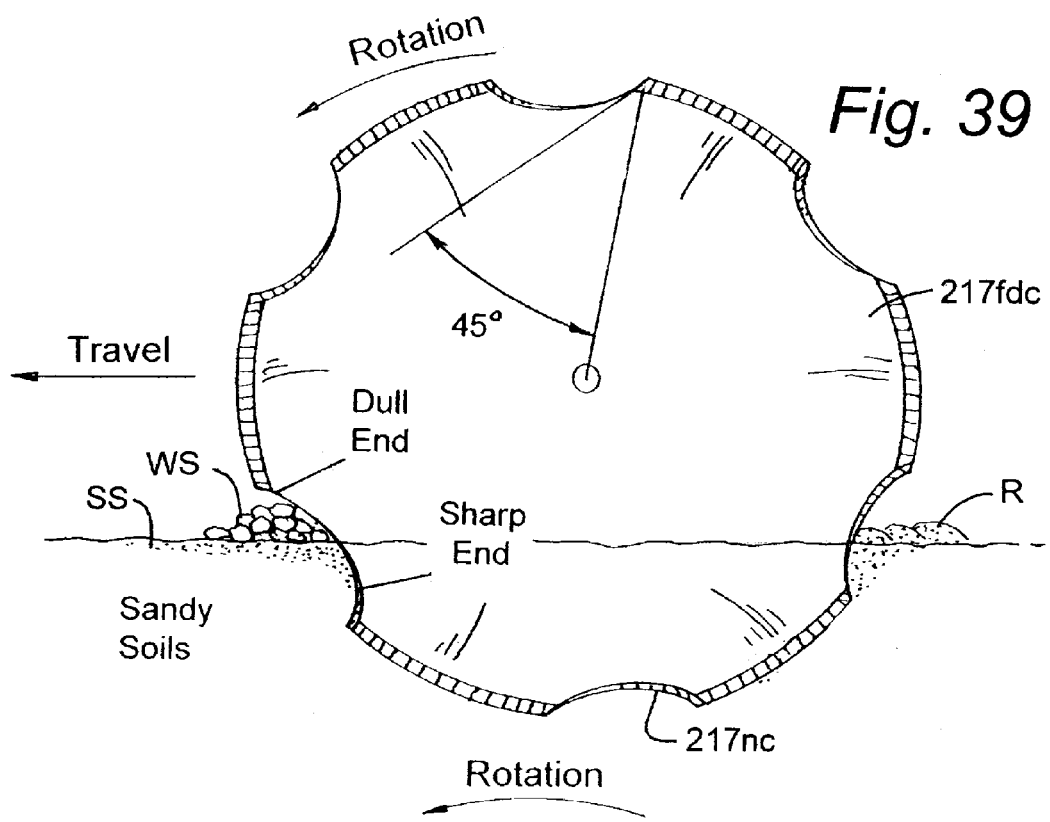
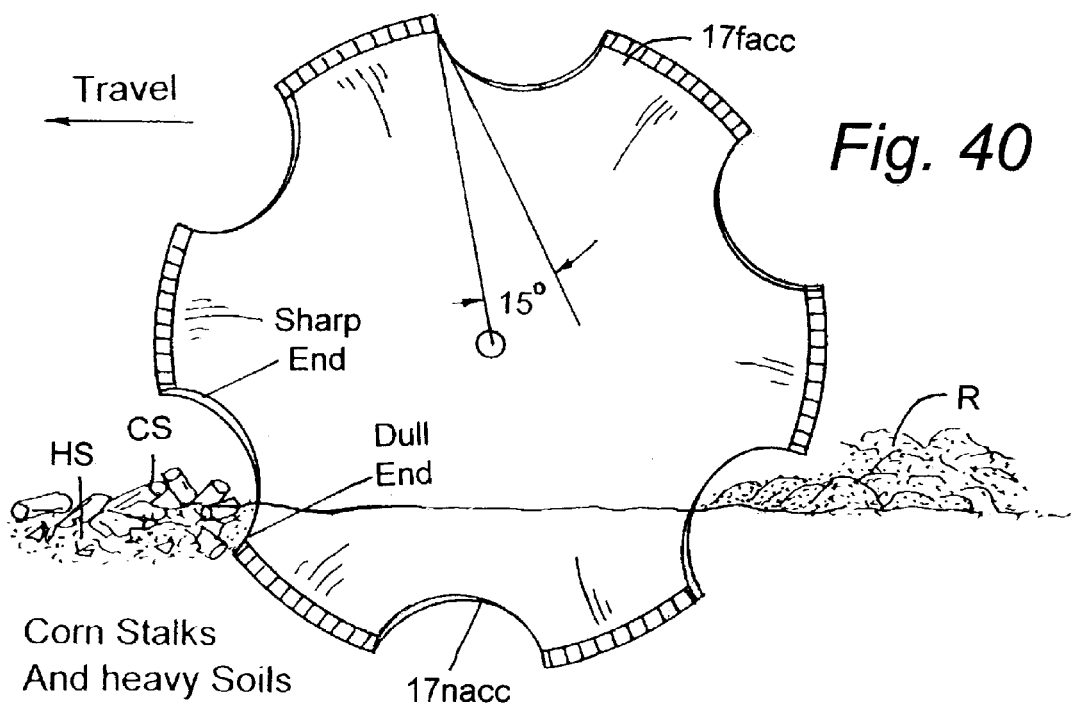

NOTCHED COULTER/DISC AND METHOD OF MAKING SAME

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to tillage tools and, more particularly, to a coulter and disc and a method of making them.

2. Background Art

Coulters are presently used ahead of no-till implements—such as a planter—to fracture a narrow band of soil to prepare the soil to receive the no-till implement. U.S. Pat. No. 7,497,270 to Bruce, which is incorporated herein by reference in its entirety, shows coulters and one way of how they are used to till the soil.

A disc can be like a flat coulter that is deformed to a convex shape on one side and a concave shape on the other side so it will throw soil in one direction as it moves forwardly through the ground. Discs are most often used with a plurality of them side by side in "gangs" as shown in U.S. Pat. No. 6,554,079 to Bruce, which is incorporated herein by reference in its entirety.

Because of differences in soil types and differences among the crops being grown, there is a need for coulters and discs that can be easily adjusted in shape at the time of manufacture to conform to the conditions anticipated in the field.

BRIEF SUMMARY OF THE INVENTION

The present invention relates to an apparatus and a method of making it. The disc has a metal disc that is generally circular with an outer periphery. A plurality of notches is disposed in the outer periphery of the disc, each of the plurality of notches tapering from a predetermined thickness on a radial inside to a thinner generally sharpened edge at the radially outermost part thereof. In one embodiment of the invention each notch has a forward end that is sharper than a rearward end so the disc will penetrate the ground easier to gather residue to be crushed and chopped by the duller following end of the notch. The disc can be either a flat coulter or a disc that is convex on one side and concave on the other side. This first embodiment is most suitable for sandy soils growing crops like wheat or oats though other uses are possible.

In another embodiment of the invention each notch has a forward end that is duller than a rearward end thereof so that the disc will tend gather the crop in the notch and then cut it with the following sharper end of the notch as the notch moves into the soil and whereby the notch with the leading dull end is more self cleaning as the notch releases from the soil. The disc of the second embodiment can be either a flat coulter or a disc that is convex on one side and concave on the other side. This second embodiment is most suitable for heavy, non-sandy, soil for fields that have corn stalks in it, though other uses are possible.

BRIEF DESCRIPTION OF THE SEVERAL VIEWS OF THE DRAWINGS

FIG. 1A shows a relationship of a 15° cut clockwise pin support axis for a disc on the right and a 15° cut counterclockwise pin support axis disc on the left in relation to a zero pin support axis;

FIG. 1B shows a relationship of a 30° cut clockwise pin support axis for a disc on the right and a 30° cut counterclockwise pin support axis disc on the left in relation to a zero pin support axis;

FIG. 1C shows a relationship of a 45° cut clockwise pin support axis for a disc on the right and a 45° cut counterclockwise pin support axis disc on the left in relation to a zero pin support axis;

FIG. 6 is a top view of the punch and die tool set up to manufacture the directional notched discs and coulters of the present invention showing how a pin holder tool can be moved along the axis of an adjusting bolt and how a support pin can go into any one of several support pin holes in the pin holder tool;

FIG. 11 is a top view of the punch and die tool set up to manufacture the directional notched discs and coulters of the present invention like in FIG. 10, but showing the set up just after a second notch is cut from the disc;

FIG. 12 is a top view of a 15 degree clockwise directional notched disc made using the process shown in FIGS. 1-11;

FIG. 13 is cross sectional view at line 13-13 of FIG. 12 after the disc is bent to have a concave convex shape using the process shown in FIG. 13A;

FIGS. 14-16 are for a 30 degree clockwise disc instead of a 15 degree clockwise disc as shown in FIGS. 10-12;

FIGS. 17-19 are for a 45 degree clockwise disc instead of a 15 degree clockwise disc as shown in FIGS. 10-12;

FIG. 36 is an enlarged portion of one part of a finished disc with a 15 degree counterclockwise cut;

FIG. 39 shows one of many possible uses of a 45 degree clockwise concave/convex disc with the dull end of the notch following the sharp end and the dull end crushes wheat stubble as the rear end of the notch goes into the soil; and FIG. 40 shows one of many other possible uses of a 15 degree counterclockwise concave/convex disc leading with the dull end of notch, the disc being shown in use in a corn field with heavy soil going through corn stocks.

DETAILED DESCRIPTION OF THE INVENTION

Figure 1:
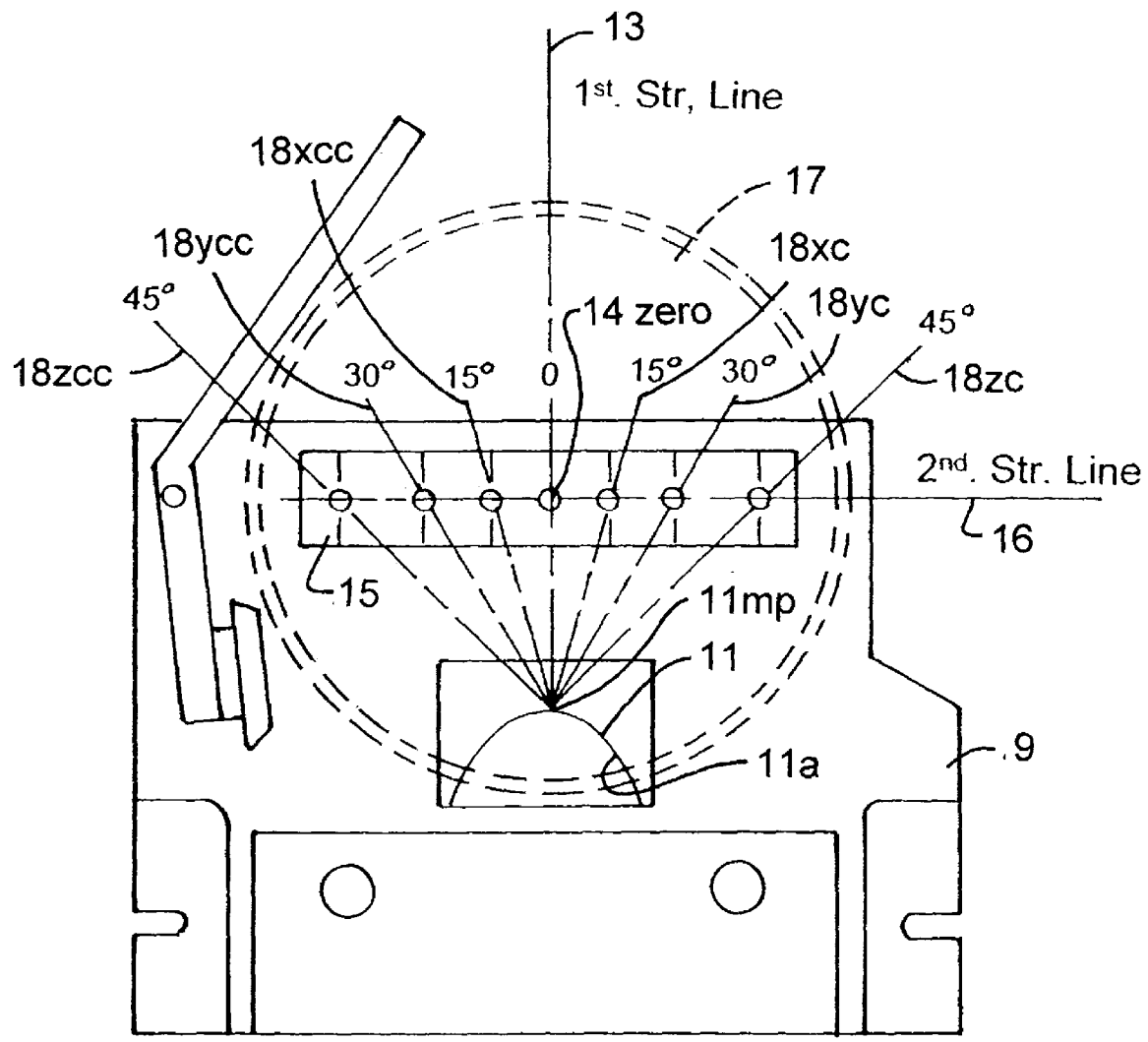
FIG. 1 is a front view of a tool with set-up locations for support pins for manufacturing discs and coulters according one method of manufacture of this invention.
Figure 2:
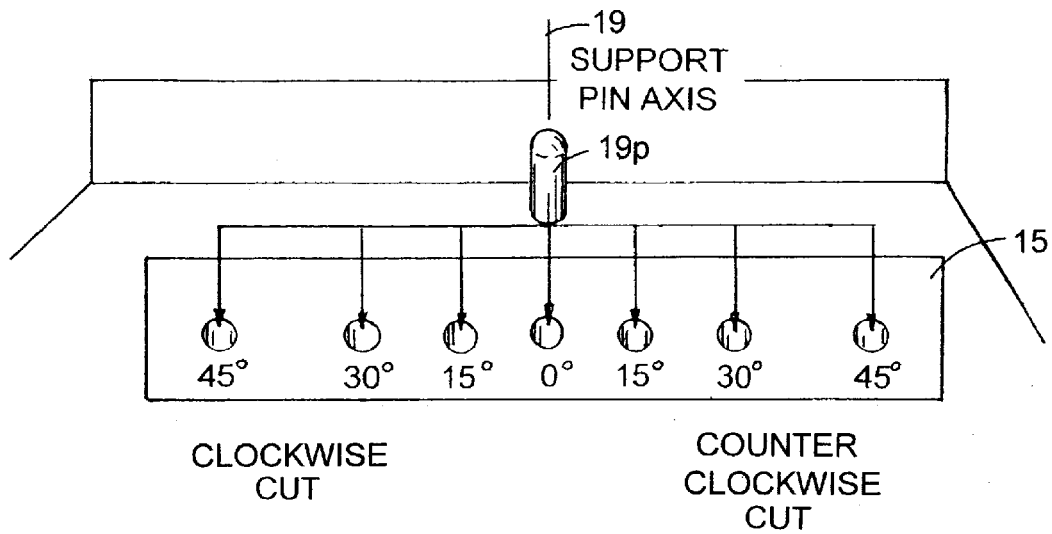
FIG. 2 is a view of a tool having a zero axis and 15°, 35° and 45° support pin axis locations.
Figure 3:
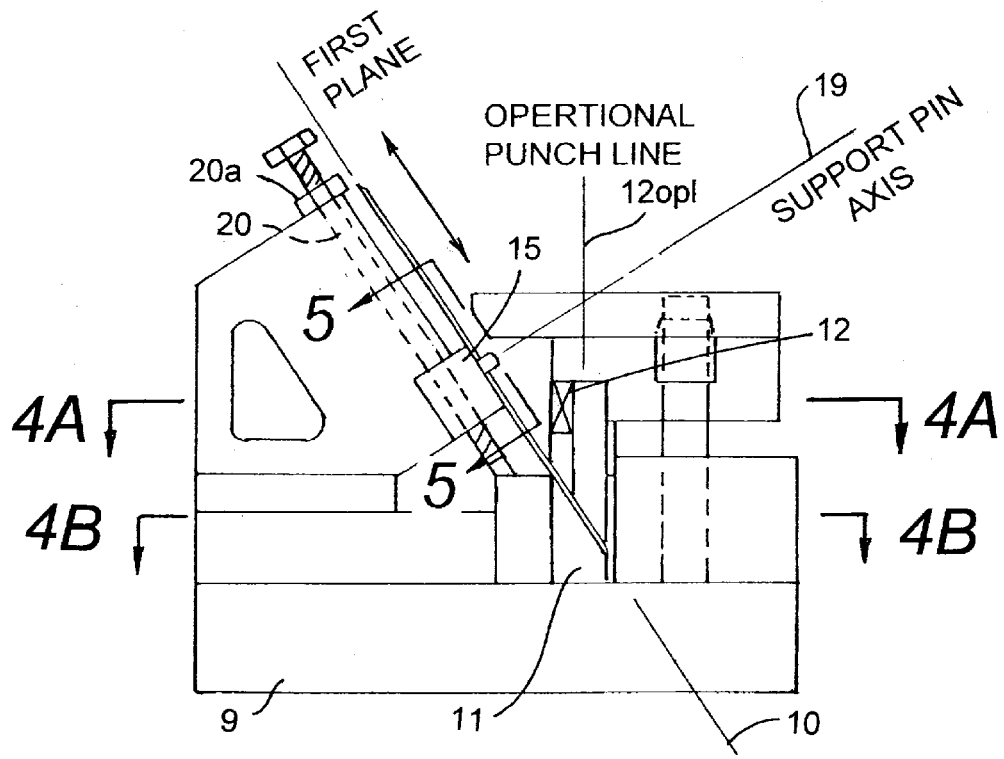
FIG. 3 is a view of a punch and die tool set up to use the process of the present invention to make discs and coulters with directional notches.
Figure 4A:
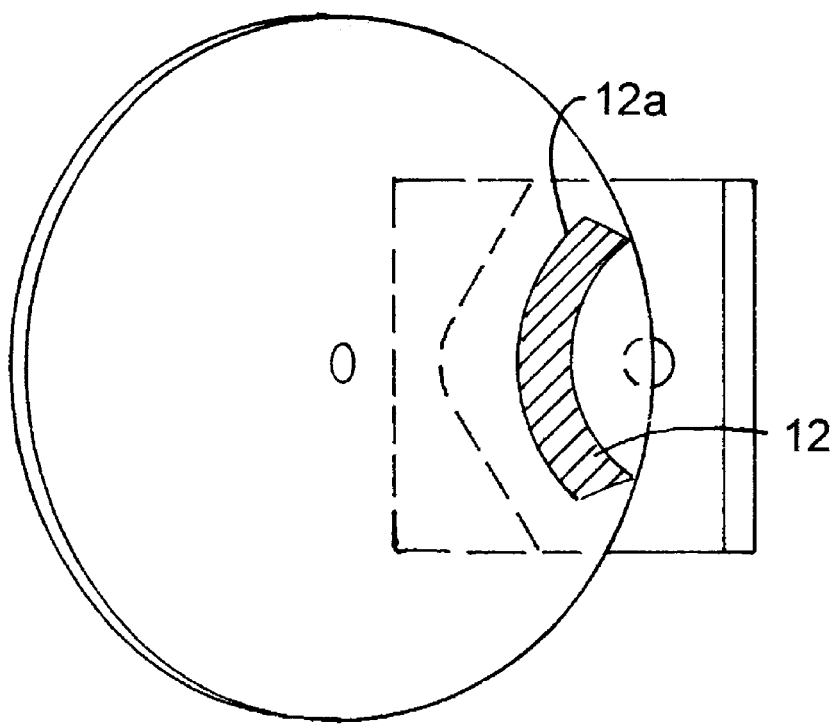
FIG. 4A is a partial cross sectional view along line 4A-4A of FIG. 3 showing a punch in cross section.
Figure 4B:
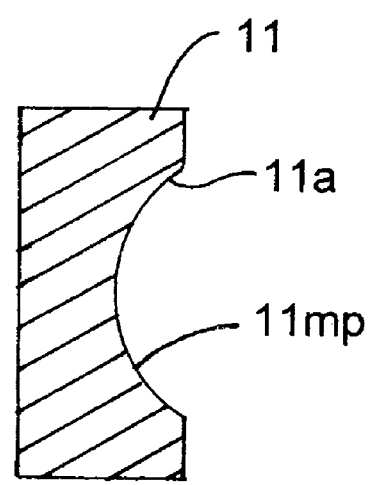
FIG. 4B is a partial cross sectional view along line 4B-4B of FIG. 3 showing a die.
Figure 7:
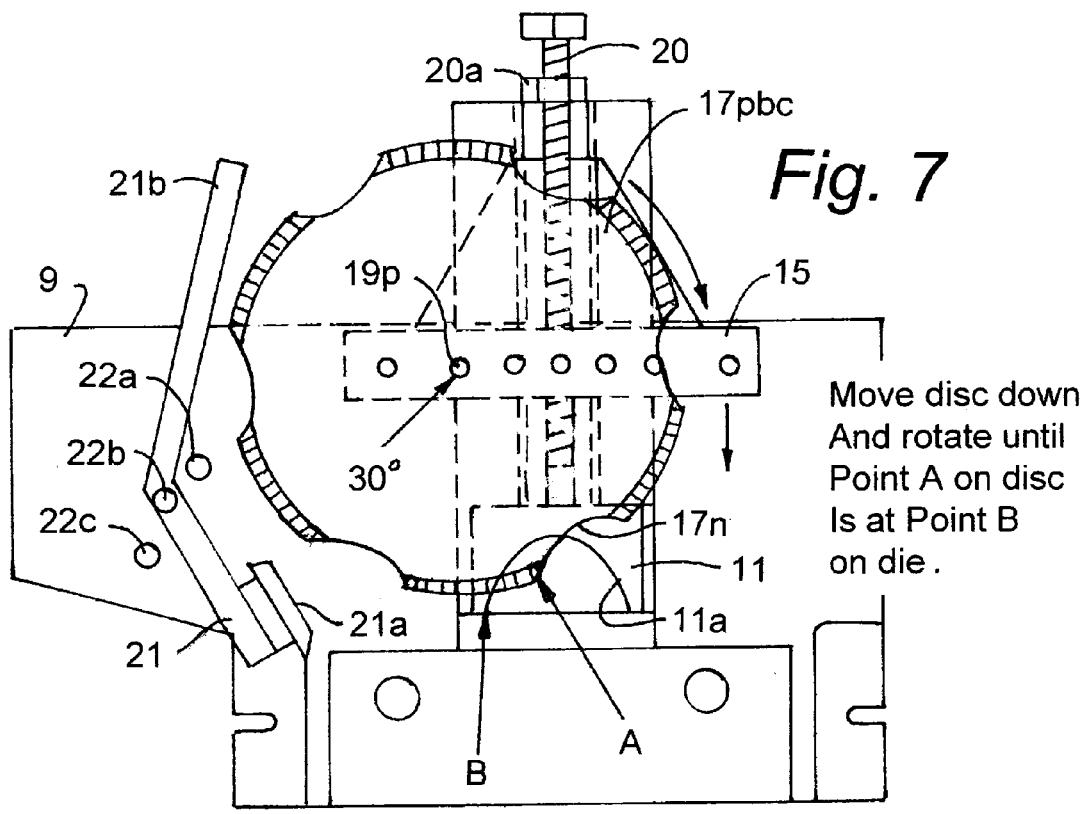
FIG. 7 is a top view of the punch and die tool set up to manufacture the directional notched discs and coulters of the present invention showing how a pattern disc is placed on a support pin in a clockwise 30 degree hole and how points A and B are defined.
Figure 8:
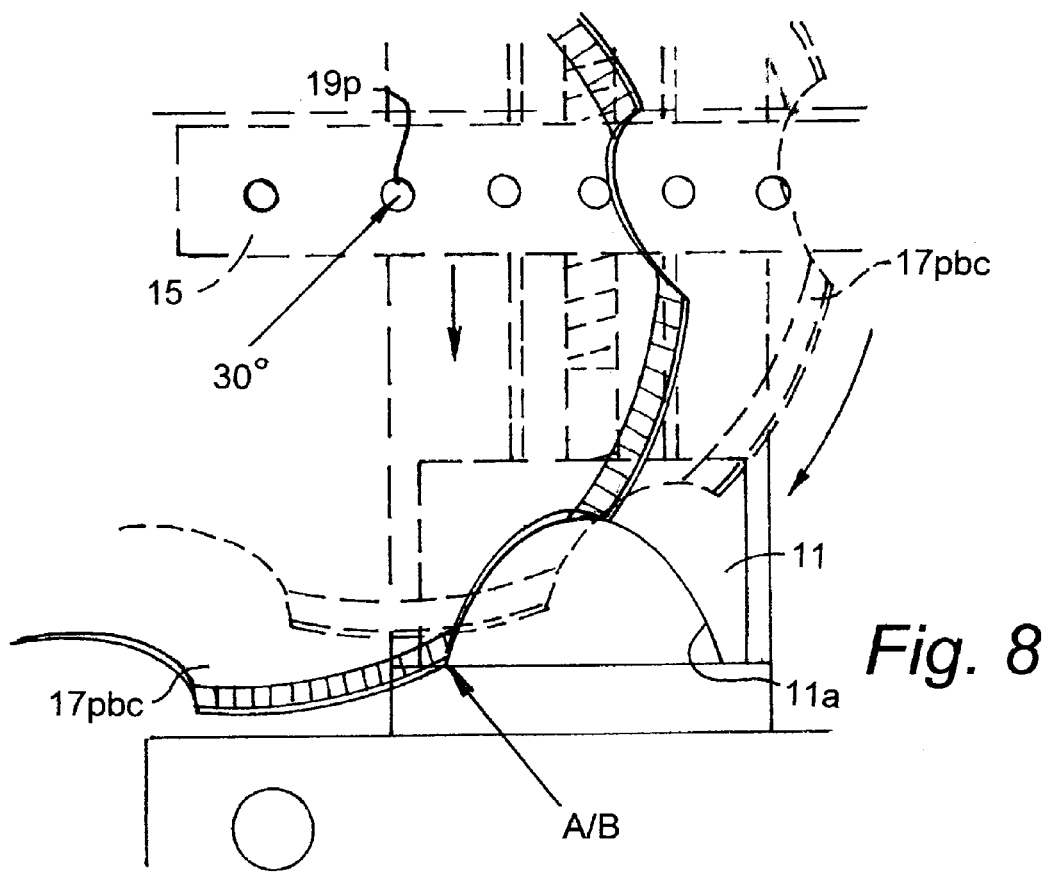
FIG. 8 is a top view of the punch and die tool set up to manufacture the directional notched discs and coulters of the present invention like in FIG. 7, but showing how points A and B brought together at the same place during a process of setting the rotational axis of the pin in a correct position for making directional discs and coulters.
Figure 9:
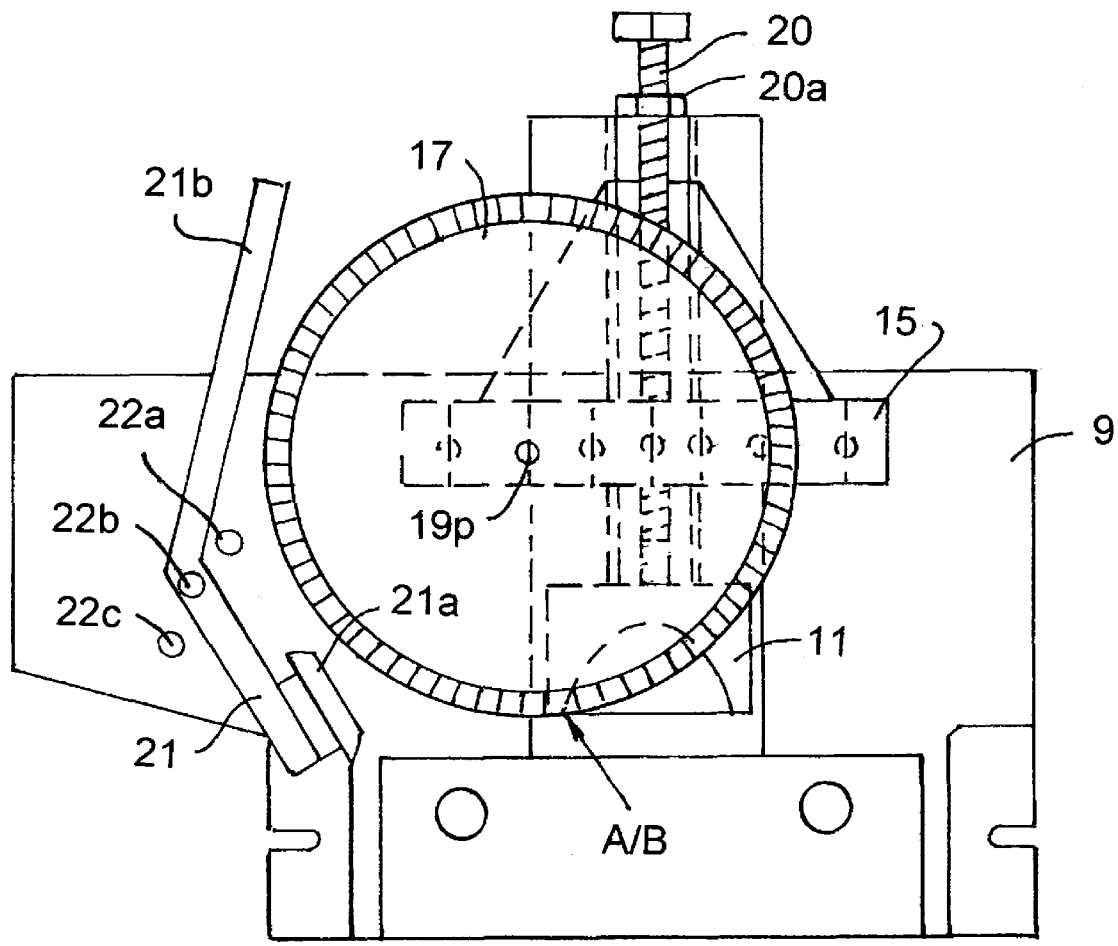
FIG. 9 is a top view of the punch and die tool set up to manufacture the directional notched discs and coulters of the present invention like in FIG. 7, but showing the set up just before a first notch is cut from a disc for a 30 degree clockwise cut.
Figure 10:
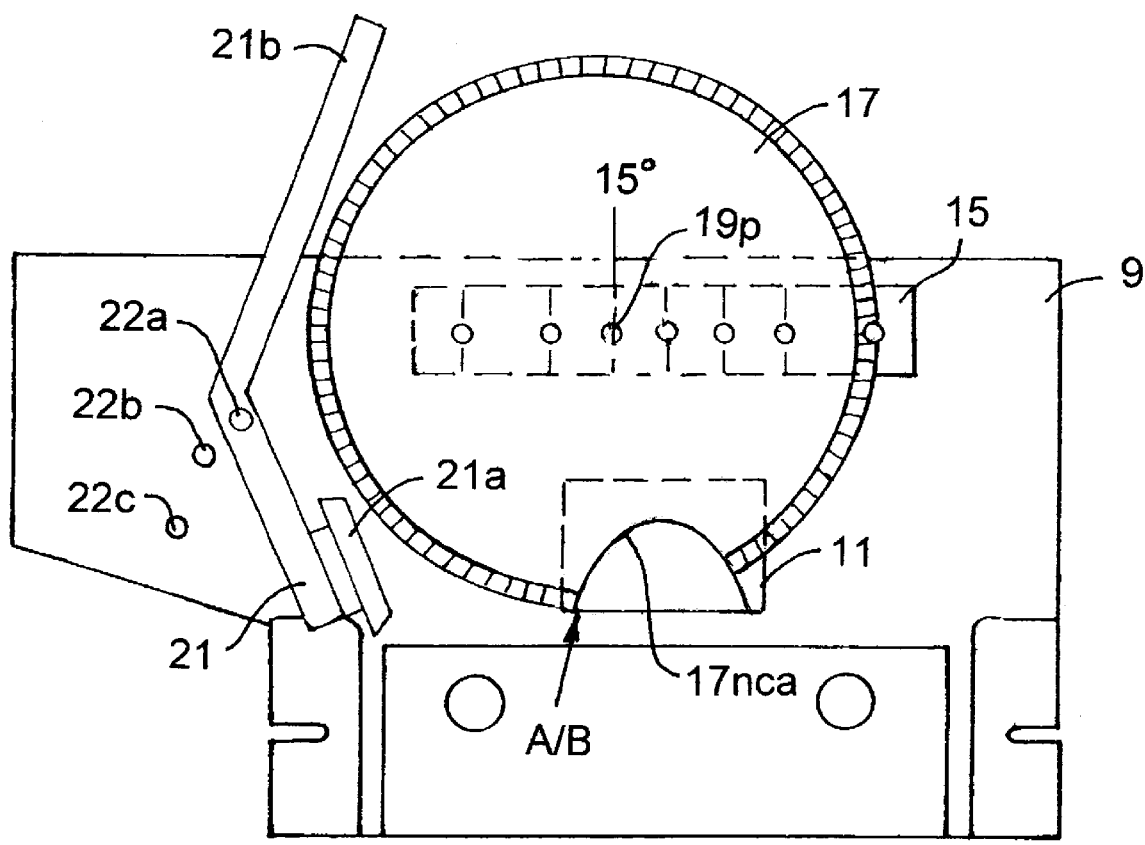
FIG. 10 is a top view of the punch and die tool set up to manufacture the directional notched discs and coulters of the present invention like in FIG. 7, but showing the set up just after a first notch is cut from a disc and for a 15 degree clockwise cut disc.

Referring now to the drawings, wherein like reference numerals designate identical or corresponding parts throughout the several views, FIGS. 1-19 show a method of making a notched blade. This method includes:

(A) providing a support surface along a first plane 10 as shown in FIG. 3 on a tool holder 9;

(B) placing a die 11 (FIGS. 1, 3, 4a, 6, 7 and 9) on one side of the support surface 10, the die 11 having an arcuate supporting surface 11a on said one side thereof, the arcuate supporting surface 11a including an arc with a midpoint center 11mp;

(C) providing a punch 12 (FIGS. 3, 4A, 4B and 5) having a cutting edge 12a complementary to the arcuate supporting surface 11a of the die 11, the punch 12 having a first position (FIGS. 3 and 5) on another side of the support surface 11a and being moveable, along an operational punch line 12opl that is straight, between the first position (FIGS. 3 and 5) and a second position substantially in contact with the die 11;

(D) laying out a first straight line 13 (FIG. 1) disposed in a first plane of the support surface, the first straight line 13 (FIG. 1) extending from the center 11mp of the arcuate supporting surface 11a to a first tool holder zero axis 14zero on a tool holder 15, the operational punch line 12opl being disposed at an acute angle with respect to the first plane 10 (FIG. 3);

(E) laying out a second straight line 16 (FIG. 1) disposed in the first plane 10 (FIG. 3), the second straight line 16 (FIG. 1) being perpendicular to the first straight line 13 (FIG. 1);

(F) the first tool holder zero axis 14zero being perpendicular to the first plane 10 at a place where the first 13 and second 16 lines intersect (FIG. 1);

(G) determining the size of a production circular disc 17 (FIG. 5) to be notched, the production disc 17 (FIG. 5) being of a predetermined radius and having a center rotational axis;

(H) placing a disc, such as pattern disc 30 degrees clockwise 17pbc (FIGS. 6, 7 and 8) of the size of the production disc 17 (FIG. 5) actually, or conceptually using engineering drawing techniques, on the tool holder 9 (FIG. 3) for reference purposes with the center rotational axis of the circular disc 17pbc being coincident with the zero axis 14zero;

(I) using a third straight line (any one of lines 18xc, 18yc, 18zc, 18xcc, 18ycc or 18zcc shown in FIG. 1) disposed in the first plane 10 (FIG. 3) and extending through the center of the arcuate supporting surface 11mp of the disc 17 at a predetermined angle with respect to the first straight line 13 (FIG. 1), the third straight line (any one of lines 18xc, 18yc, 18zc, 18xcc, 18ycc or 18zcc shown in FIG. 1) also intersecting the second straight line 14 (FIG. 1) at a support pin axis 19 (FIGS. 2 and 3), the support pin axis 19 (FIGS. 2 and 3) being perpendicular to the first plane 10 (FIG. 3);

(J) placing a support pin 19p at the support pin axis 19 (FIGS. 2 and 3);

(K) placing a pattern circular disc 17 pbc (FIG. 7) on the support surface 10 so that the center rotational axis of the pattern circular disc 17pbc is the same as the support pin axis 19 and so that the pattern circular disc 17 pbc is rotatable about the support pin axis 19, the support pin 19p and support pin axis 19 being at least temporarily fixed with respect to the tool holder 9 and spaced a predetermined distance from the die 11, the pattern circular disc 17 pbc having at least one notch 17n of a configuration and size desired to be formed in a production circular disc;

(L) selecting one edge of the at least one notch 17n of the pattern circular disc 17pbc to be point A (FIG. 7);

(M) selecting a point on the arcuate support surface to be point B (FIG. 7);

(N) moving the pattern disc point A to point B in the arcuate support surface 10 by moving the support pin 19p and rotating the pattern disc 17pbc (FIG. 7 to FIG. 8);

(O) removing the pattern disc 17pbc from the support pin 19p;

(P) placing the production circular disc 17 (FIG. 9) to be notched on the support surface 10 so that the center rotational axis of the production circular disc 17 (FIG. 9) is the same as the support pin axis 19 and so that the production circular disc 17 is rotatable about the support pin axis 19, the support pin 19p and the support pin axis 19 being at least temporarily fixed with respect to the tool holder 9 at such time;

(Q) while keeping the production circular disc 17 (FIG. 9) to be notched stationary, moving the cutting surface 12a of the punch 12 between a first and a second position of the punch 12, through a first portion of the production circular disc 17 to be notched that is at that time located between the punch 12 and the die 11, thereby cutting off said first portion of the production circular disc to be notched from the remainder of the production circular disc 17 (FIG. 10) to form a notch 17nca;

(R) (i) moving the punch 12 to the first position thereof (FIGS. 3 and 5), (ii) rotating (from FIG. 10 to FIG. 11) the production circular disc 17 to be notched about the support pin axis 19 by a predetermined amount and again (iii) moving the punch 12 with respect to the die 11 from the first (FIGS. 3 and 5) to the second position thereof to cut off a second portion (FIG. 11) of the production circular disc to be notched to form another notch 17nca in the production circular disc 17 to be notched; and (S) repeating step (R) until the production circular disc 17f (FIG. 12) has evenly spaced notches 17nca disposed around the periphery thereof.

Figure 13A:
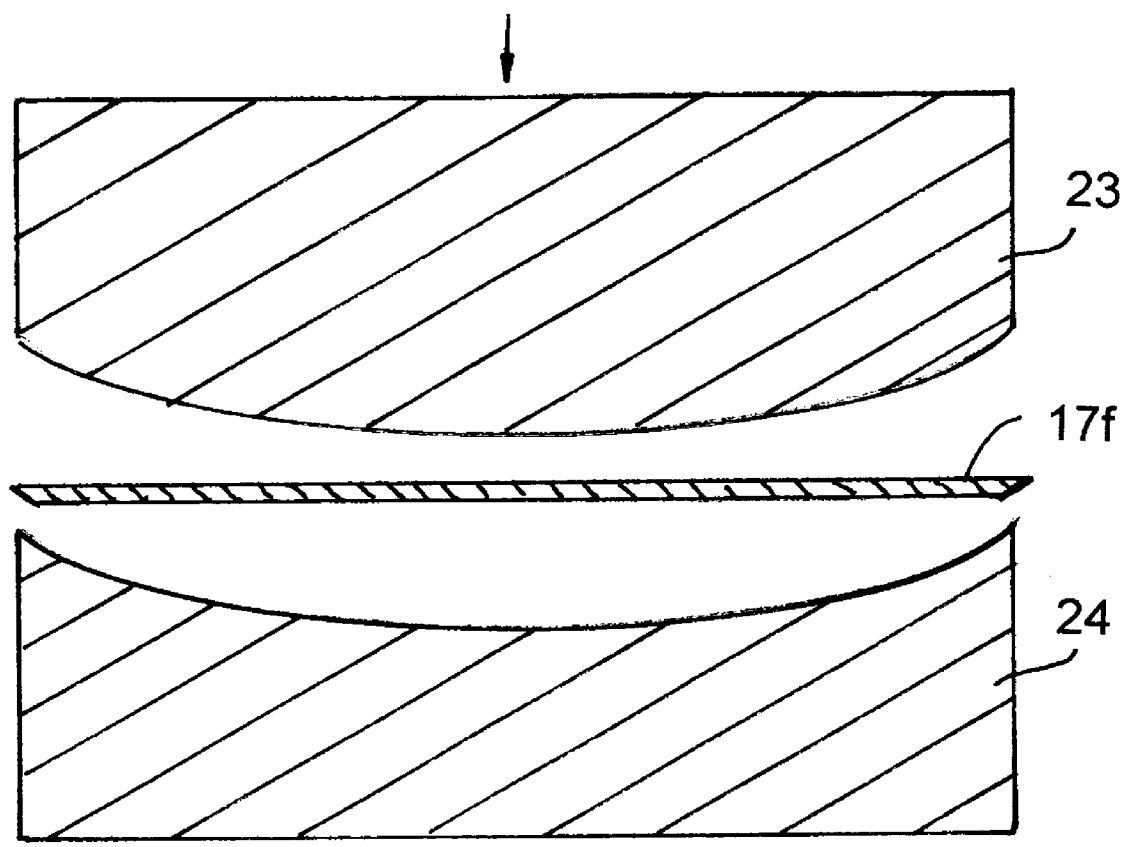
FIG. 13A is cross sectional view showing how tooling is used to bend the disc to have a concave/convex shape.

Although not required, a preferred step is sharpening the exterior periphery 17s of the disc 17 before any of the notches are cut therefrom. Optionally the method can include bending the coulter disc 17f so that the disc is concave on one side and convex on the other side thereof as shown in FIGS. 13 and 13A when bending part 23 is pushed towards bending part 24 (or vice versa) with disc 17f being between bending parts 23 and 24. The bending is typically done while the disc 17f is hot, but could be done when it is cold.

Also, optionally the method can include using a locking device 21 (FIG. 11) in a notch which has been already been cut to hold the disc from rotating while another notch is being cut. See FIG. 11 for example which shows how locking device 21 has a part 21a at the bottom of a handle 21b, locking device 21 pivoting about a pin through one of holes 22a, 22b or 22c in tool holder 9, depending upon the angle of the clockwise cut chosen.

Figure 5:
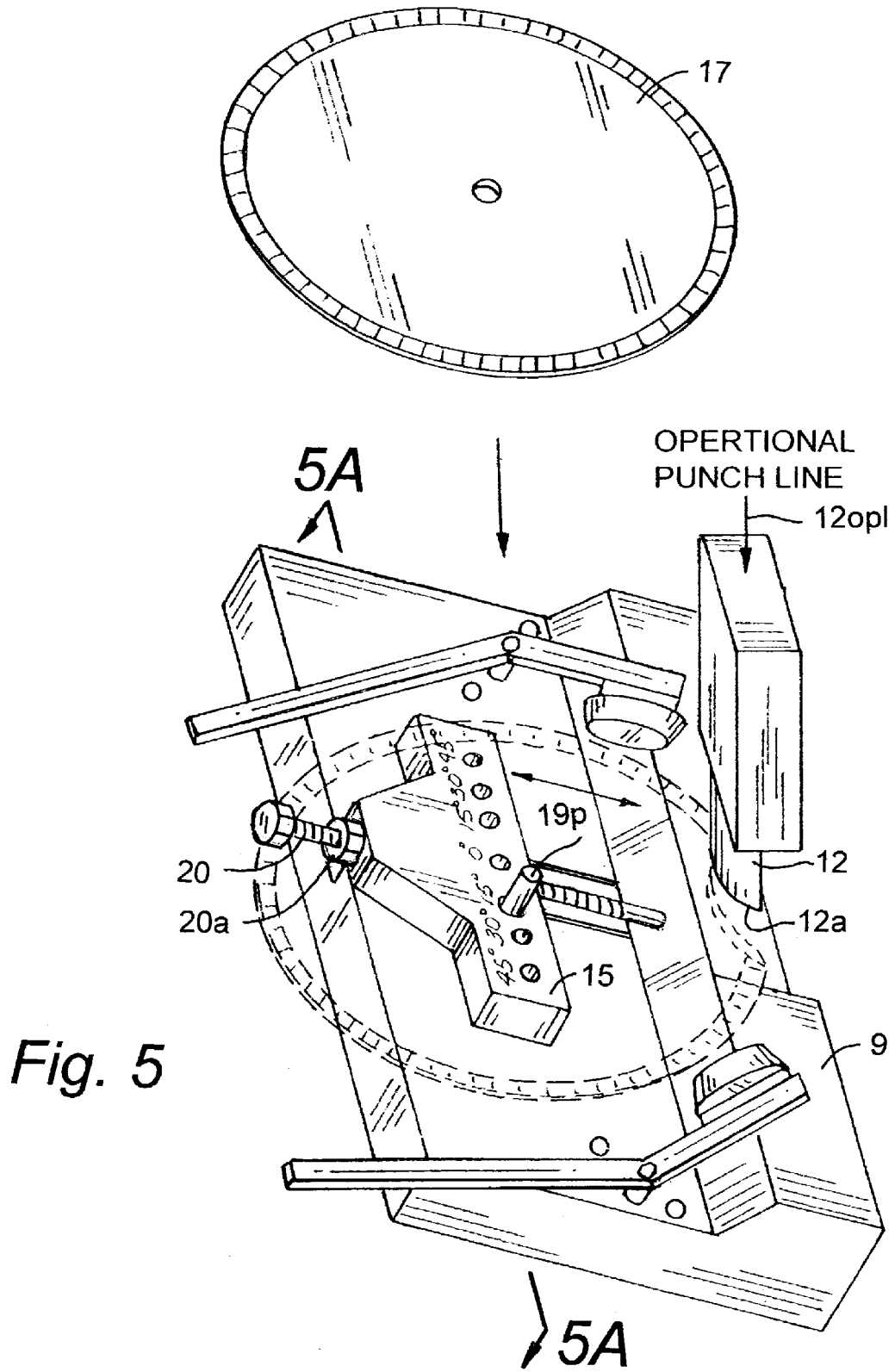
FIG. 5 is a perspective view of the punch and die tool set up to manufacture the directional notched discs and coulters of the present invention.
Figure 5A:
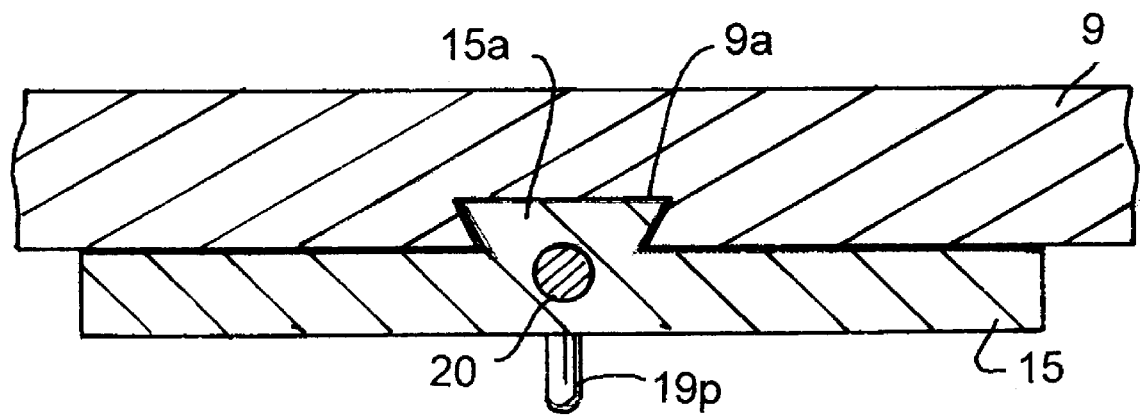
FIG. 5A is a cross-sectional view along line 5A-5A of FIG. 5.

FIGS. 5 and 5A show sequentially how a bolt 20 is threadably engaged with pin holder 15 so that as bolt 20 is rotated in one direction the pin holder 15 moves up and when the bolt 20 is rotated in an opposite direction the pin holder 15 moves down with respect to the housing 9 and die 11. A locknut bolt 20a is used to prevent movement of the bolt 20 with respect to the pin holder 15 when pin holder 15 is in the position desired for use. FIG. 5A is a cross sectional view along line 5A-5A of FIG. 5 and shows how a dovetail joint, including projection 9a and depression 15a, holds pin holder 15 in place while it is moved up or down with respect to tool holder 9.

Figure 14:
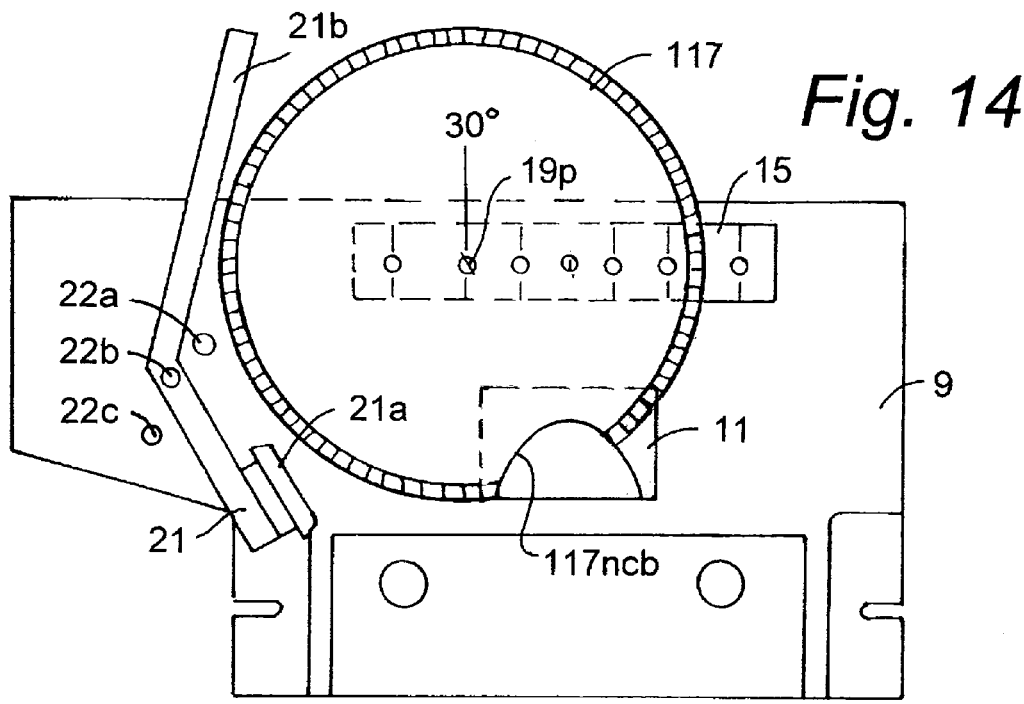
FIGS. 14-16 are the same as FIGS. 10-12 except
Figure 15:
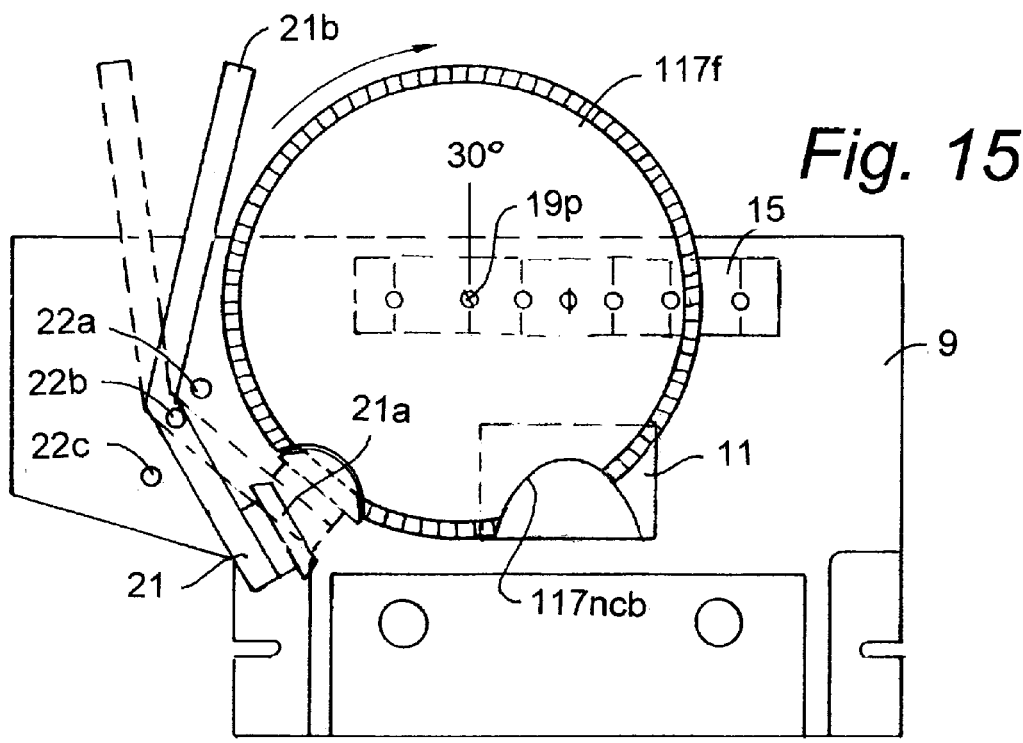
Figure 16:
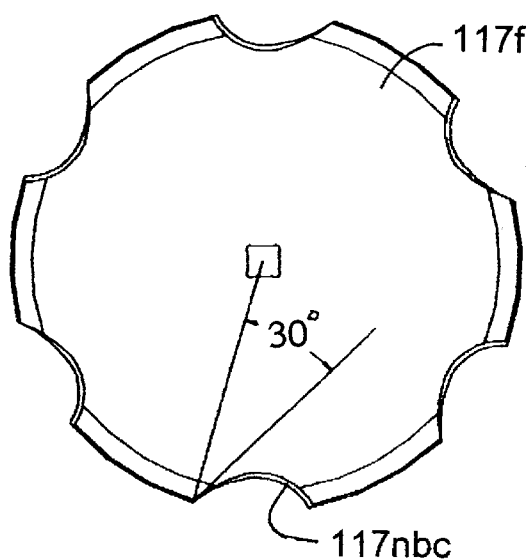

FIGS. 14, 15 and 16 show sequentially how a 30 degree clockwise coulter disc 117f is made with notches 117ncb like the explanation above referring to FIGS. 10-13 for a 15 degree clockwise disc 17f clockwise disc.

Figure 17:
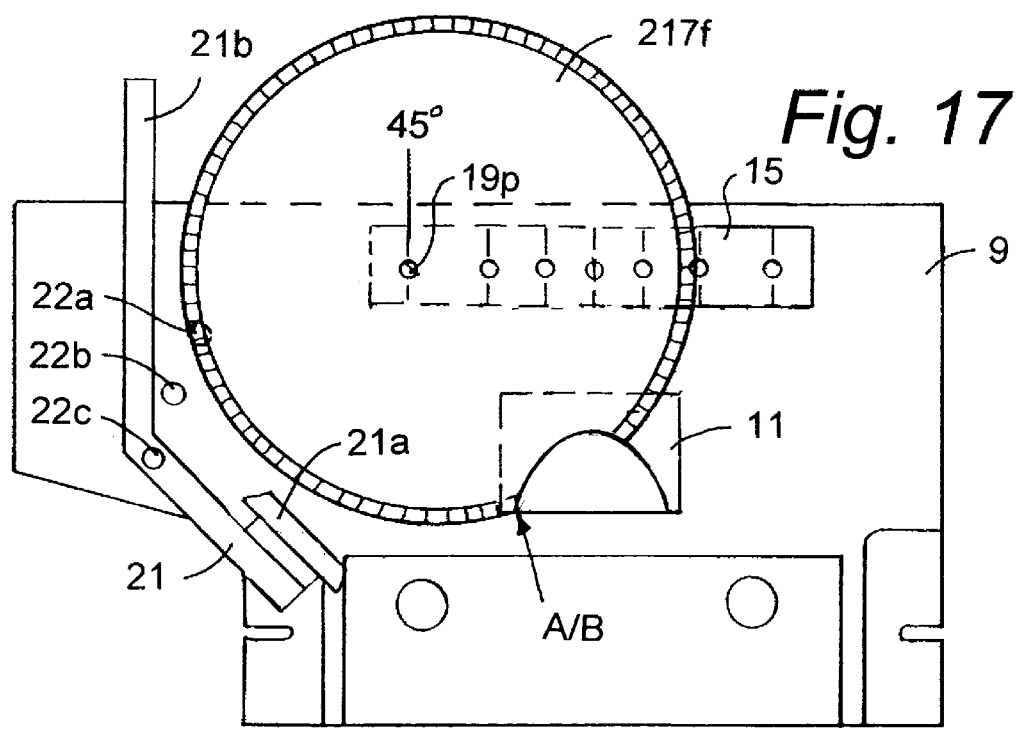
FIGS. 17-19 are the same as FIGS. 10-12 except
Figure 18:
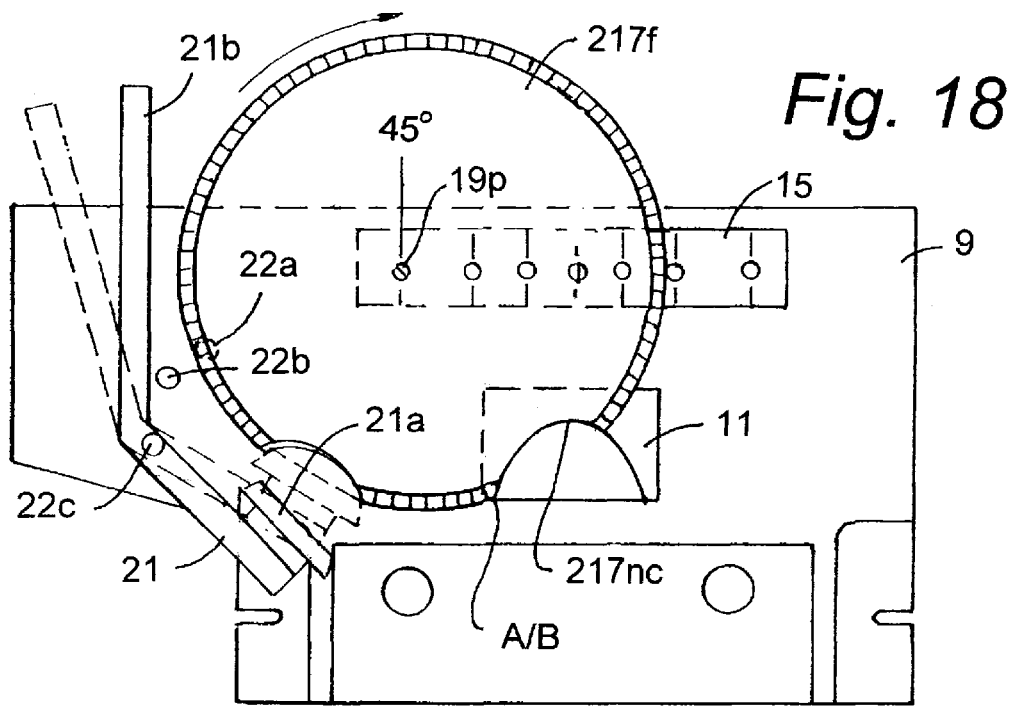
Figure 19:
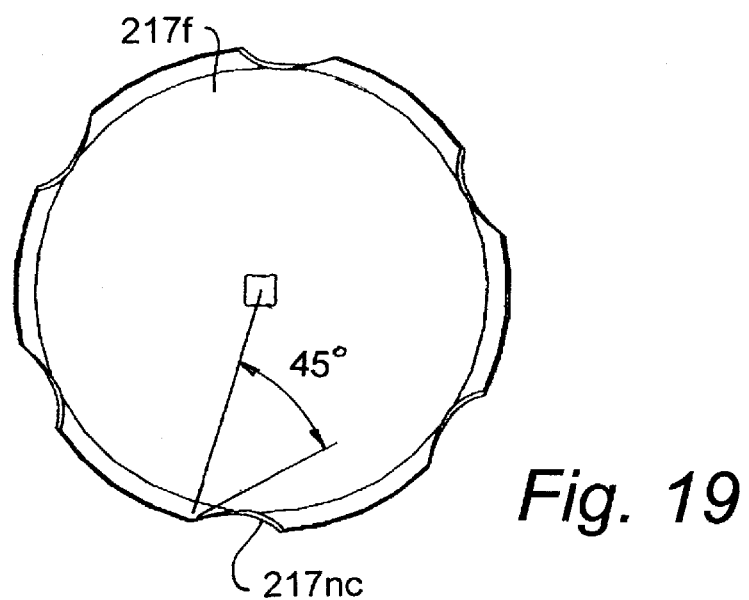

FIGS. 17, 18 and 19 show sequentially how a 45 degree clockwise coulter disc 217f is made with notches 217nc like the explanation above referring to FIGS. 10-13 for a 15 degree clockwise disc 17f clockwise disc with notches 17nca.

Figure 20:
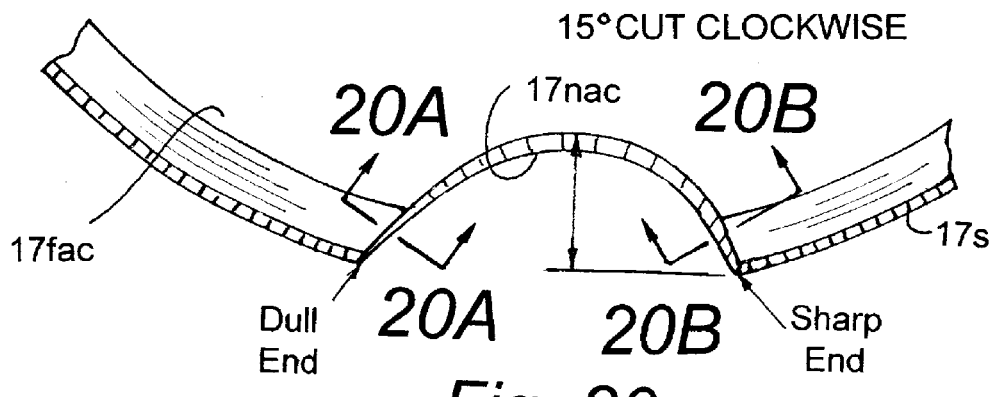
FIG. 20 is an enlarged portion of one part of a finished disc with a 15 degree clockwise cut.
Figure 21:
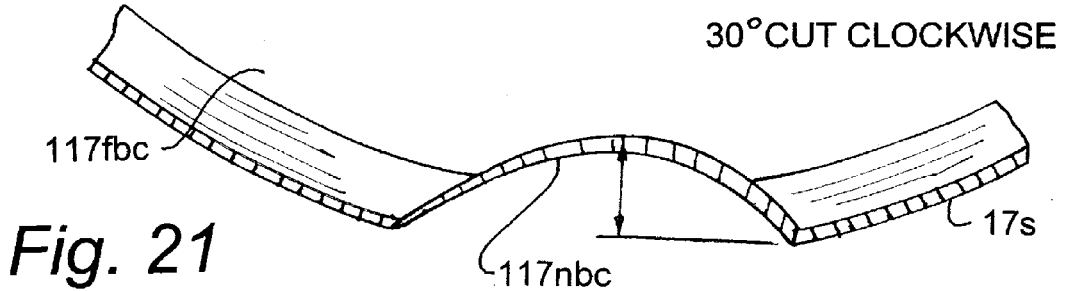
FIG. 21 is an enlarged portion of one part of a finished disc with a 30 degree clockwise cut.
Figure 22:
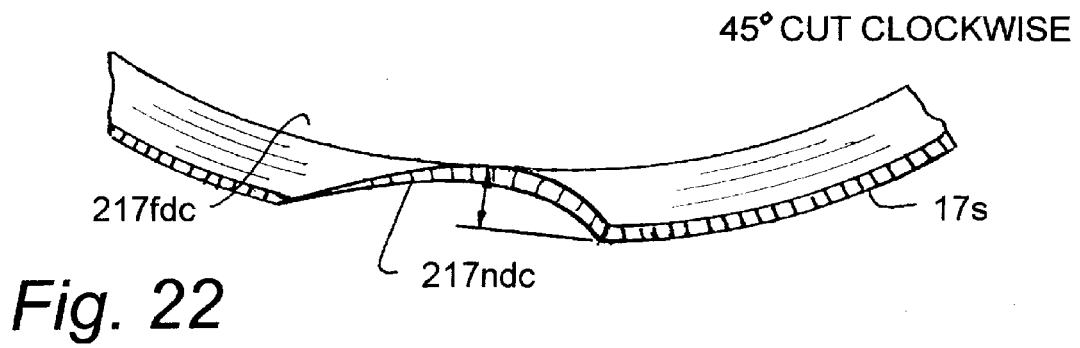
FIG. 22 is an enlarged portion of one part of a finished disc with a 45 degree clockwise cut.
Figure 23:
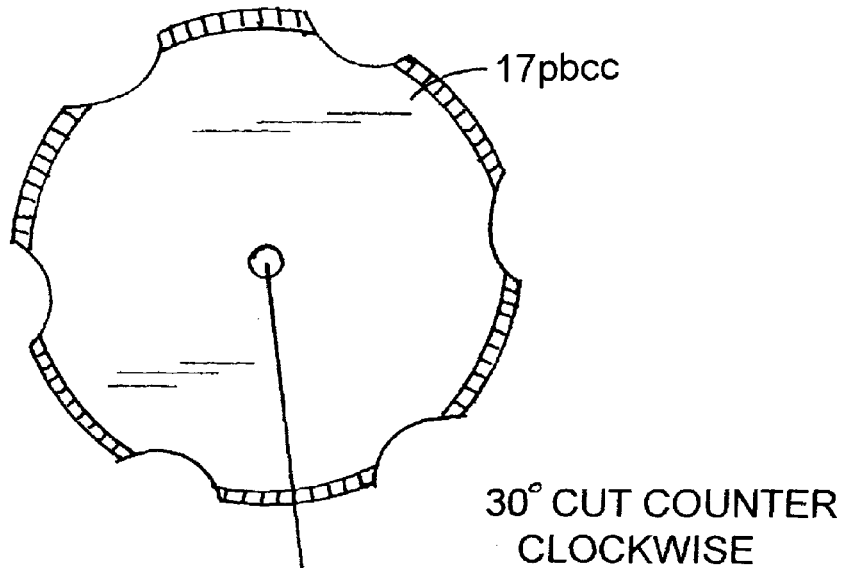
FIGS. 23-29 correspond respectively to FIGS. 6-12 except that FIGS. 23-29 show the process of setting up the equipment and making a counterclockwise disc instead of a clockwise disc as shown in FIGS. 6-12.
Figure 23:
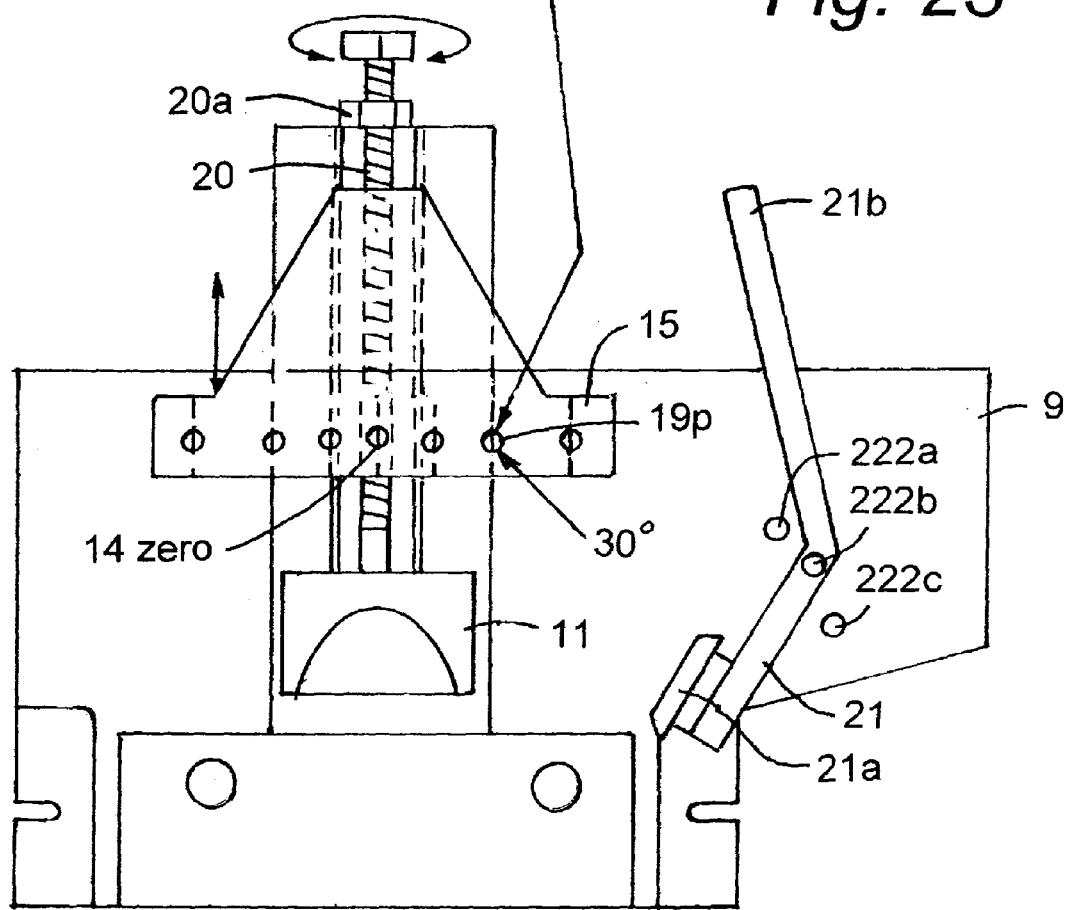
Figure 24:
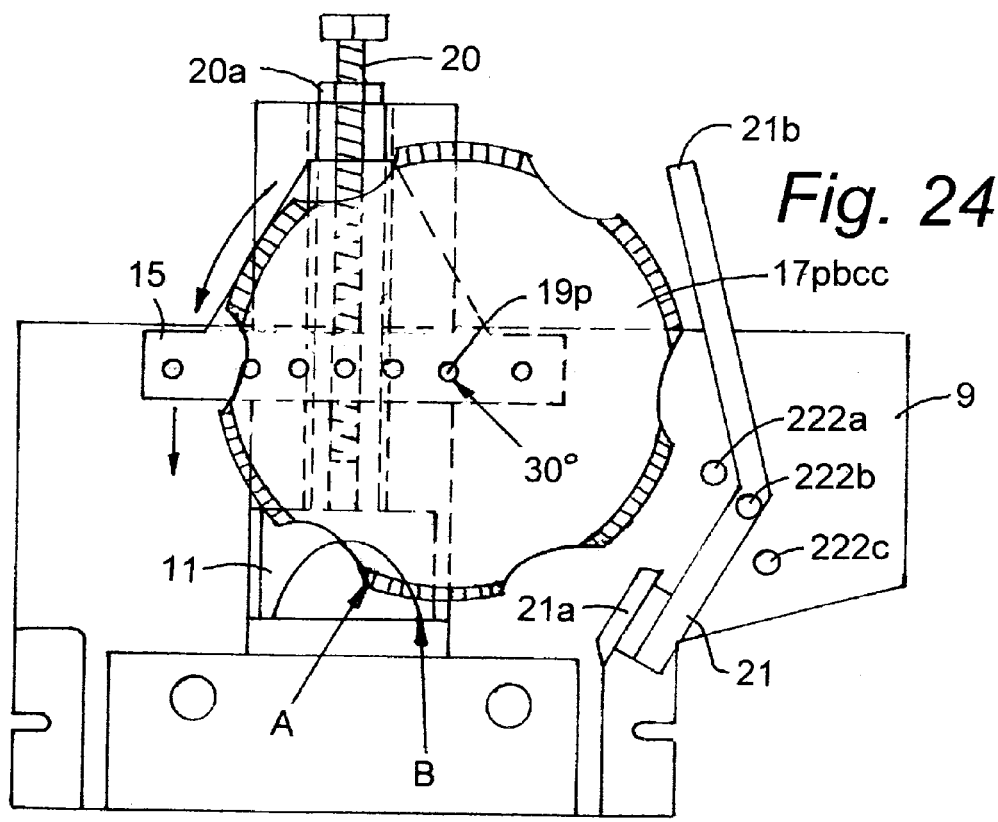
Figure 25:
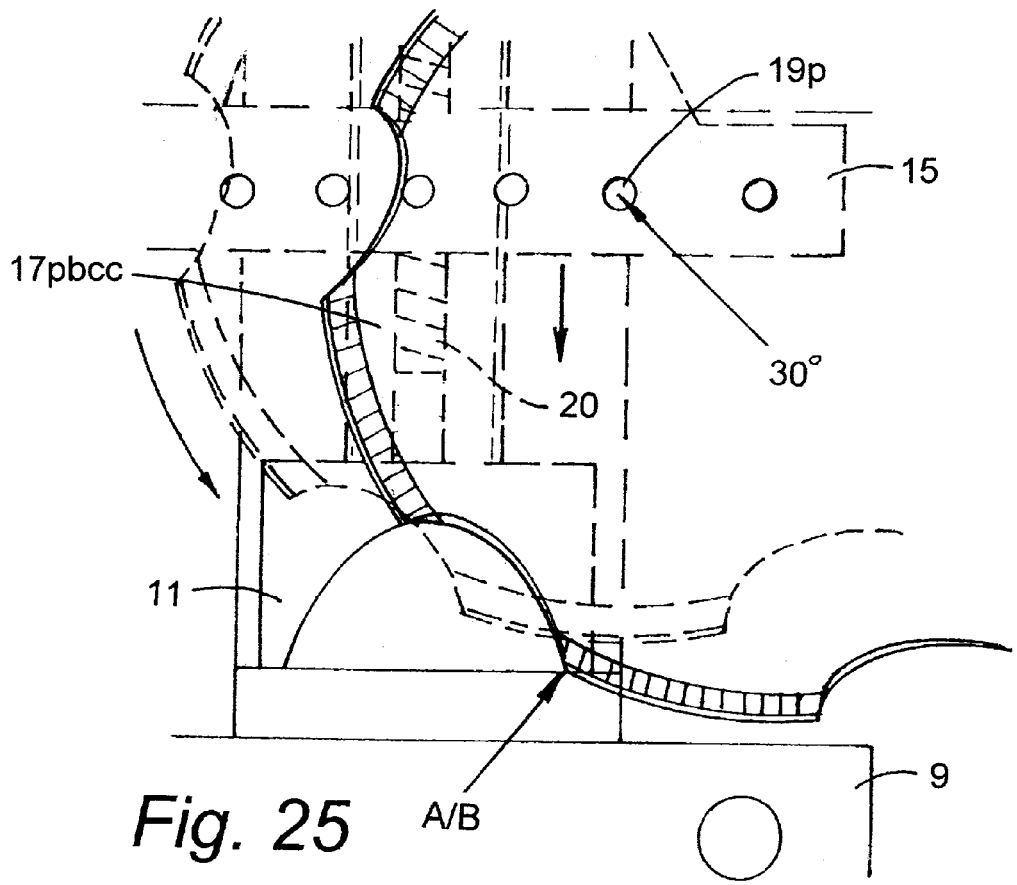
Figure 26:
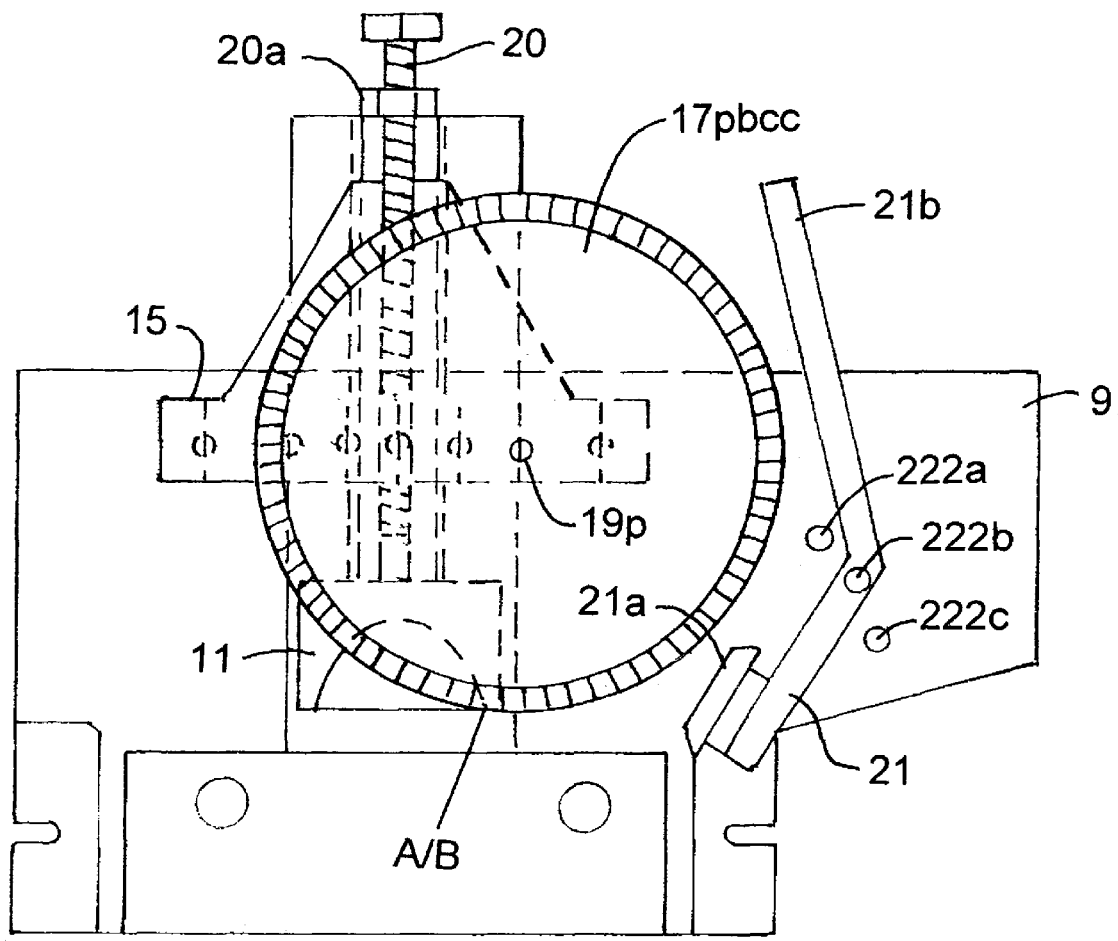

FIGS. 20, 21 and 22 show discs 17fac, 117fbc and 217fdc with corresponding notches 17nac, 117nbc and 217ndc. As shown in FIGS. 20, 21 and 22 the dull end of each respective notch 17nac, 117nbc and 217ndc is on the left and the sharp end is on the right.

Figure 20A:
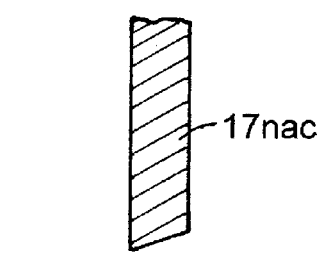
FIG. 20A is a cross sectional view taken along line 20A-20A of FIG. 20 showing a dull end of a notch.
Figure 20B:
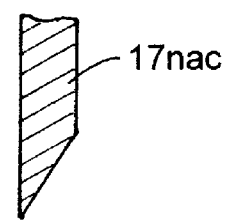
FIG. 20B is a cross sectional view taken along line 20B-20B of FIG. 20 showing a sharp end of a notch.

FIG. 20A is a cross section taken along line 20A-20A of FIG. 20 and shows that this portion of the notch 17nac is dull. FIG. 20B is a cross section taken along line 20B-20B of FIG. 20 and shows that this portion of the notch 17nac is sharp. The entire notch 17nac tapers gradually from dull to sharp from left to right as shown in FIG. 20. This is true of all of the clockwise cut notches shown in the figures of this document when viewed from this same perspective including, but not limited to, notches 117nbc and 217ndc shown in FIGS. 21 and 22.

FIGS. 23-26 illustrate how to set up the equipment to make a 30 degree counterclockwise disc with notches 117nc in disc 117pbcc correspond to the method of FIGS. 6-9 for making a 15 degree clockwise notches 17n in disc 17f. The process is essentially the same as described for FIGS. 6-9. The difference is the size of the notch, the fact that the pin 19p is located in the 30 degree hole in tool 15 to the right of the zero hole 14zero, the members 21, 21a and handle 21b are pinned in hole 222b and the disc 17f is rotated counterclockwise from FIG. 30 when the first notch 117nbcc is cut to FIG. 31 when the second notch 117nbcc is cut to make disc 117fbcc as shown in FIG. 32.

Figure 27:
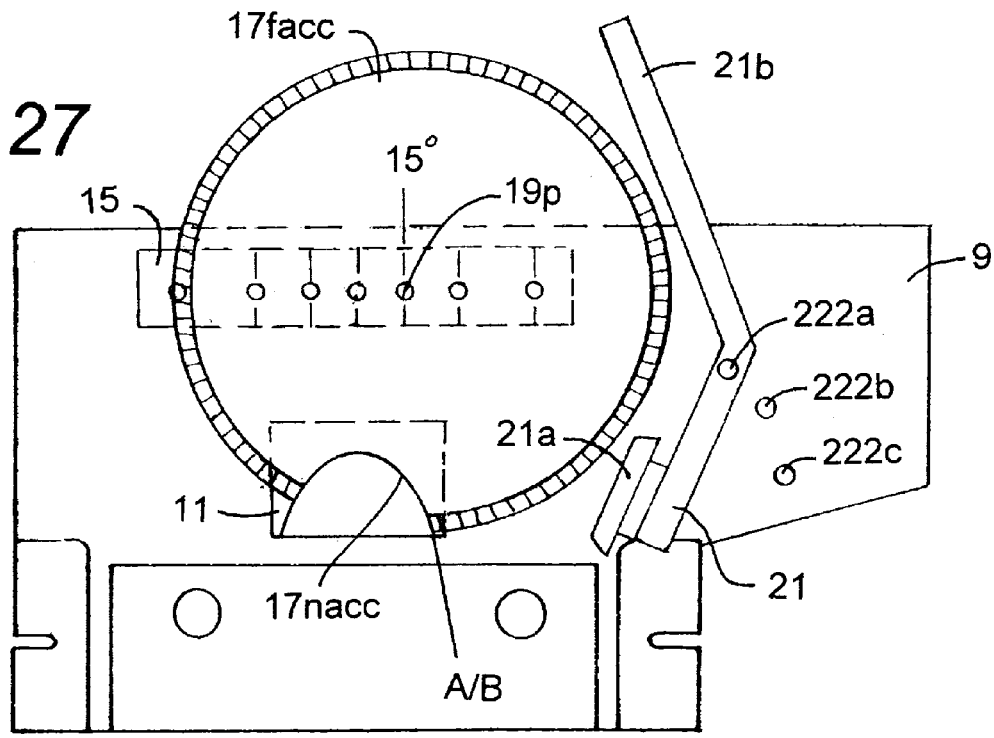
Figure 28:
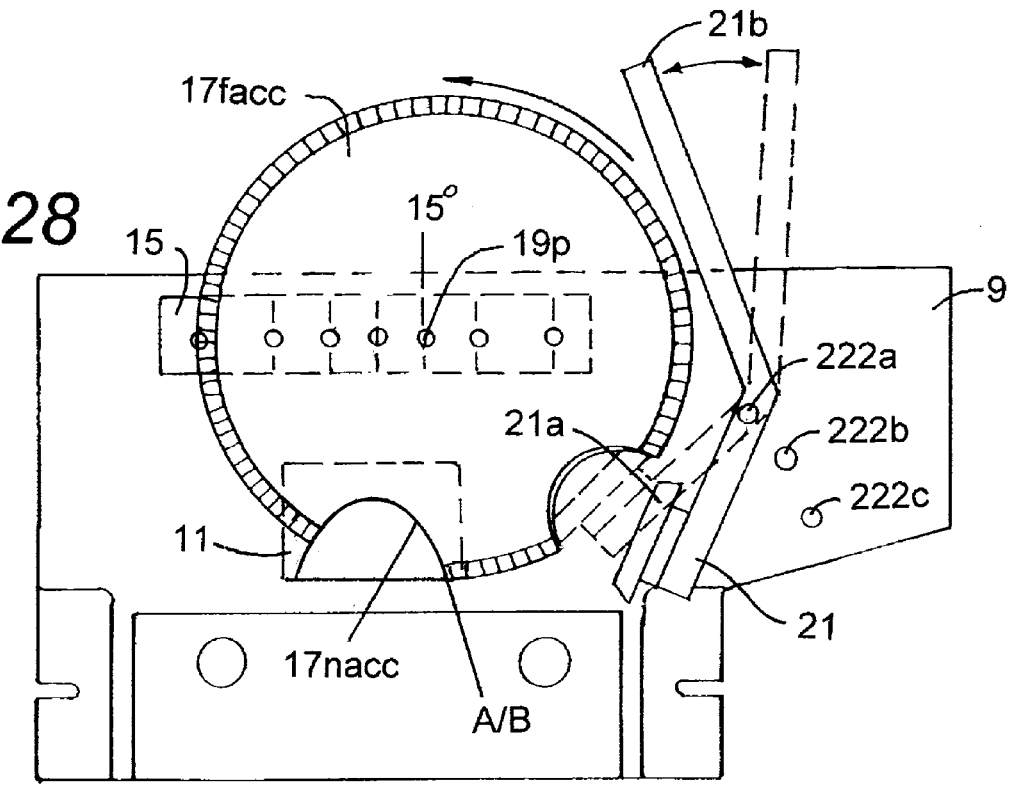
Figure 29:
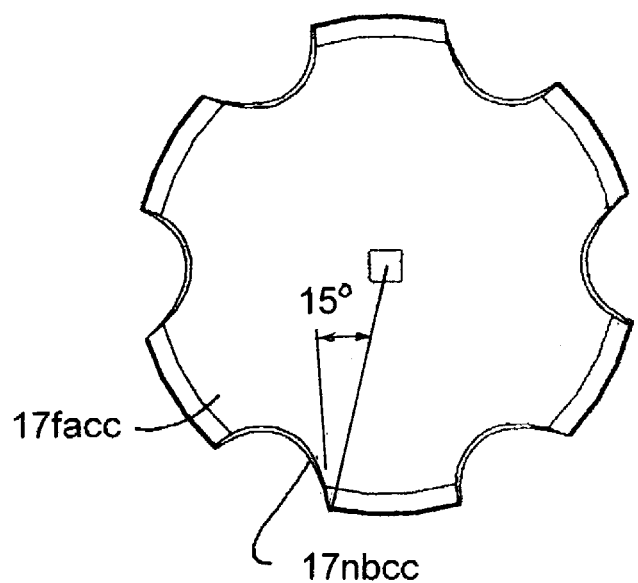

FIGS. 27 and 28 illustrate making a 15 degree counterclockwise disc 17facc with notches 17nacc in disc 17facc. The steps correspond essentially to the method of FIGS. 6-9 for making a 15 degree clockwise notches 17nc in disc 17f. The process is essentially the same as described for FIGS. 6-9, except the differences include the fact that the pin 19p is located in the 15 degree hole in tool 15 to the right of the zero hole 14zero, the members 21, 21a and handle 21b are pinned in hole 222a on the right side instead of on the left side and the disc 17facc is rotated counterclockwise from FIG. 27 when the first notch 17nacc is cut to FIG. 28 when the second notch 17nacc is cut to make disc 17facc as shown in FIG. 29.

Figure 30:
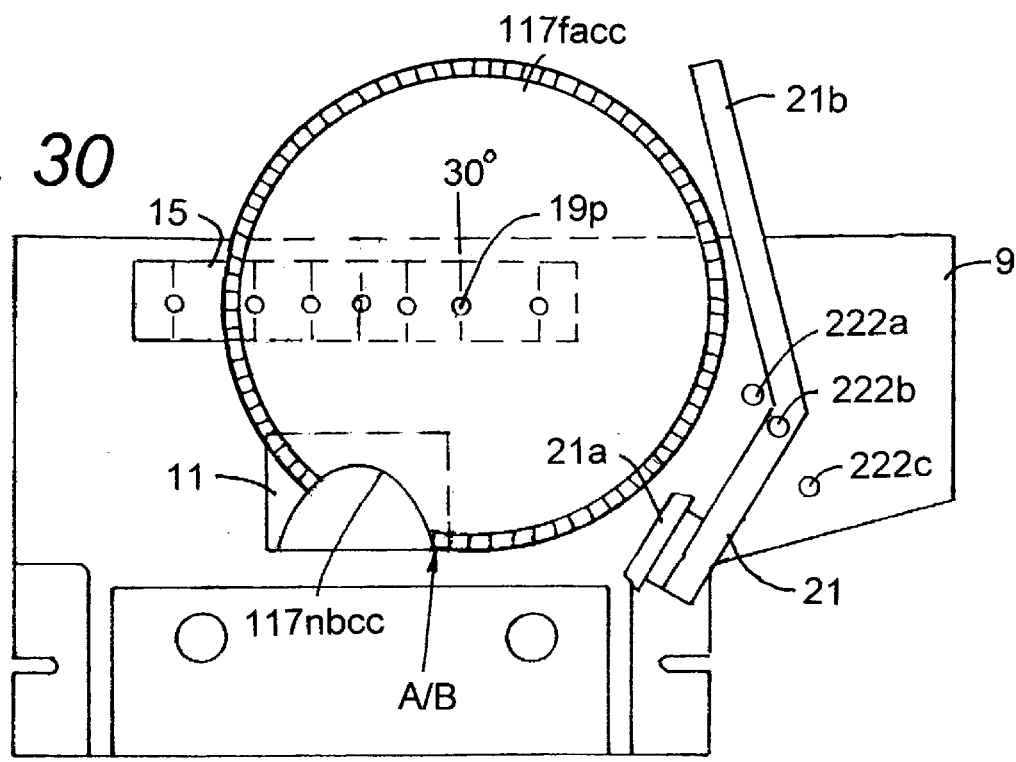
FIGS. 30-32 are the same as FIGS. 27-29, except that FIGS. 30-32 are for a 30 degree counterclockwise disc instead of a 15 degree counterclockwise disc as shown in FIGS. 27-29.
Figure 31:
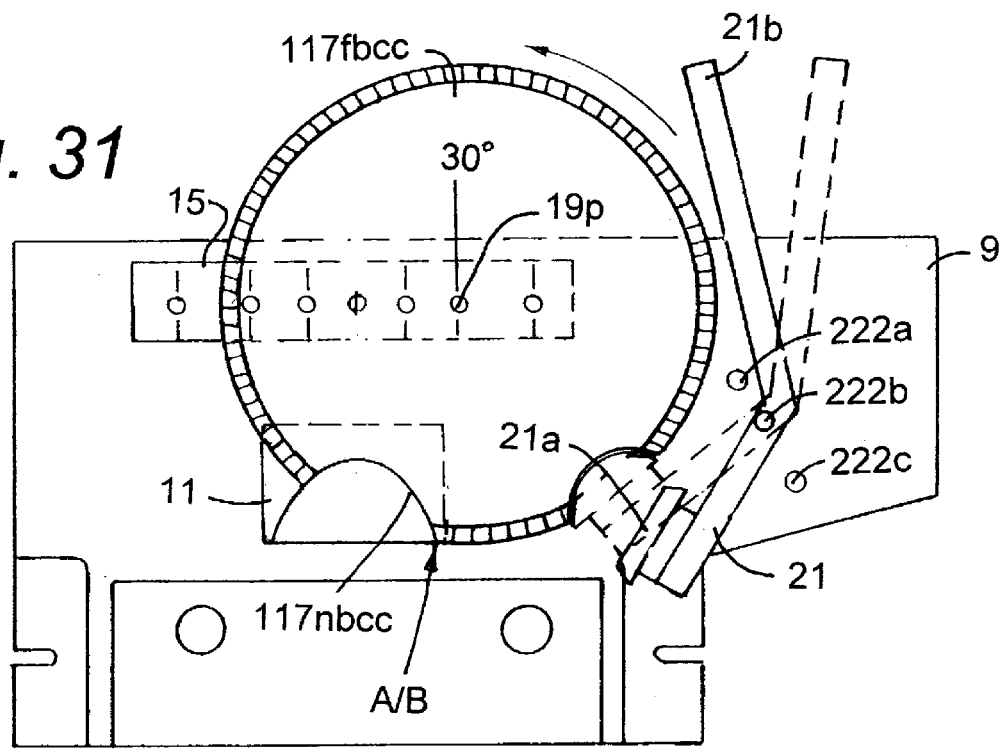
Figure 32:
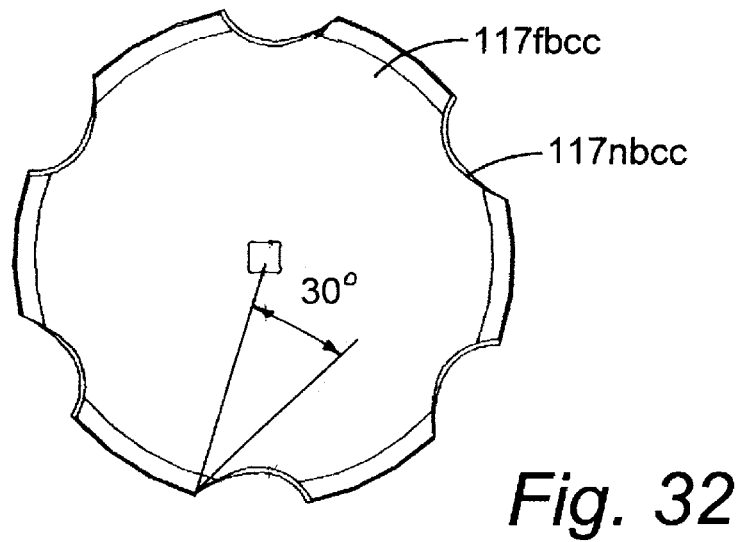

FIGS. 30 and 31 illustrate making a 30 degree counterclockwise disc 117fbcc with notches 117nbcc in disc 117fbcc. The steps correspond essentially to the method of FIGS. 6-9 for making a 15 degree clockwise notches 17nc in disc 17f. The process is essentially the same as described for FIGS. 6-9, except the differences include the fact that the pin 19p is located in the 30 degree hole in tool 15 to the right of the zero hole 14zero, the members 21, 21a and handle 21b are pinned in hole 222b on the right side instead of on the left side and the disc 17fbcc is rotated counterclockwise from FIG. 30 when the first notch 117nbcc is cut to FIG. 31 when the second notch 117nbcc is cut to make disc 117fbcc as shown in FIG. 32.

Figure 33:
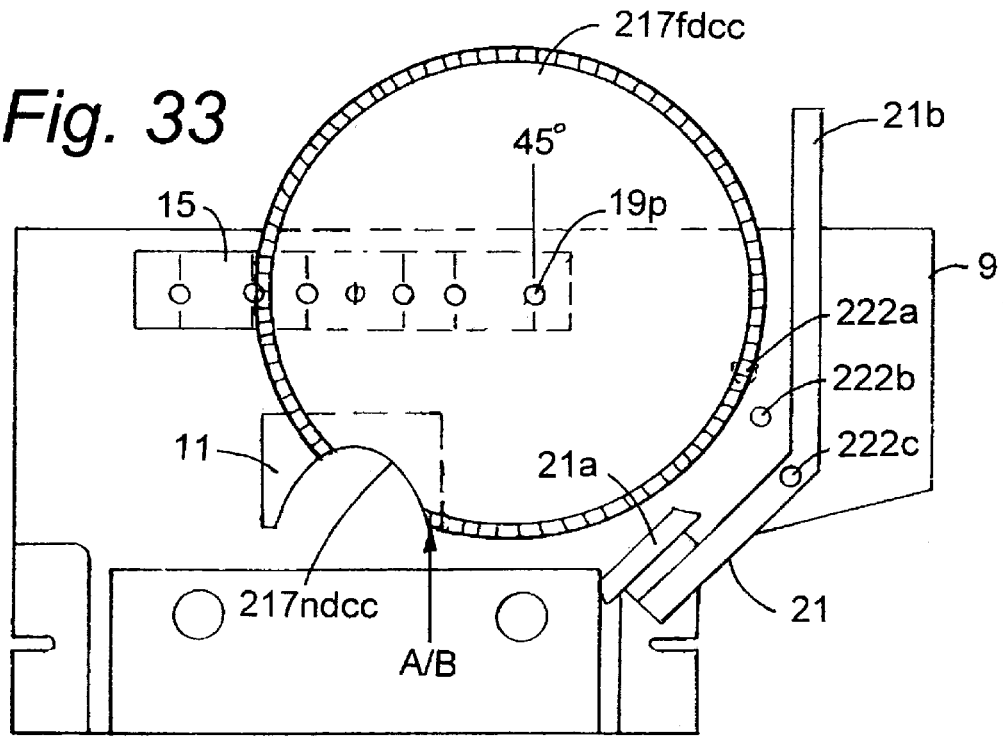
FIGS. 33-35 are the same as FIGS. 27-29, except that FIGS. 33-35 are for a 45 degree counterclockwise disc instead of a 15 degree counterclockwise disc as shown in FIGS. 27-29.
Figure 34:
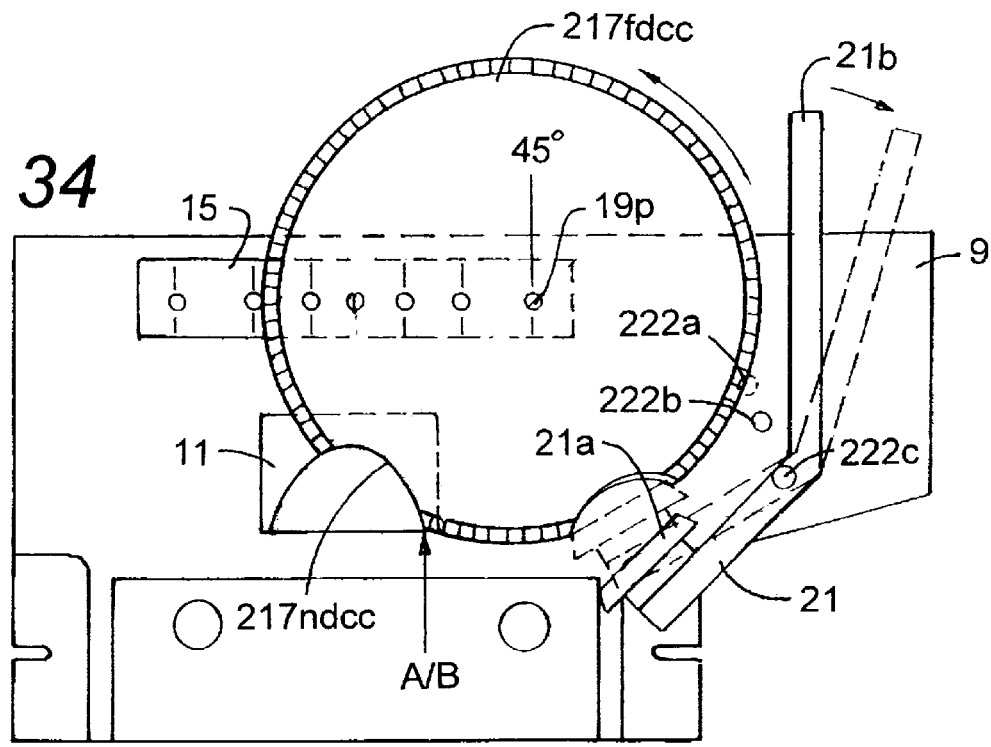
Figure 35:
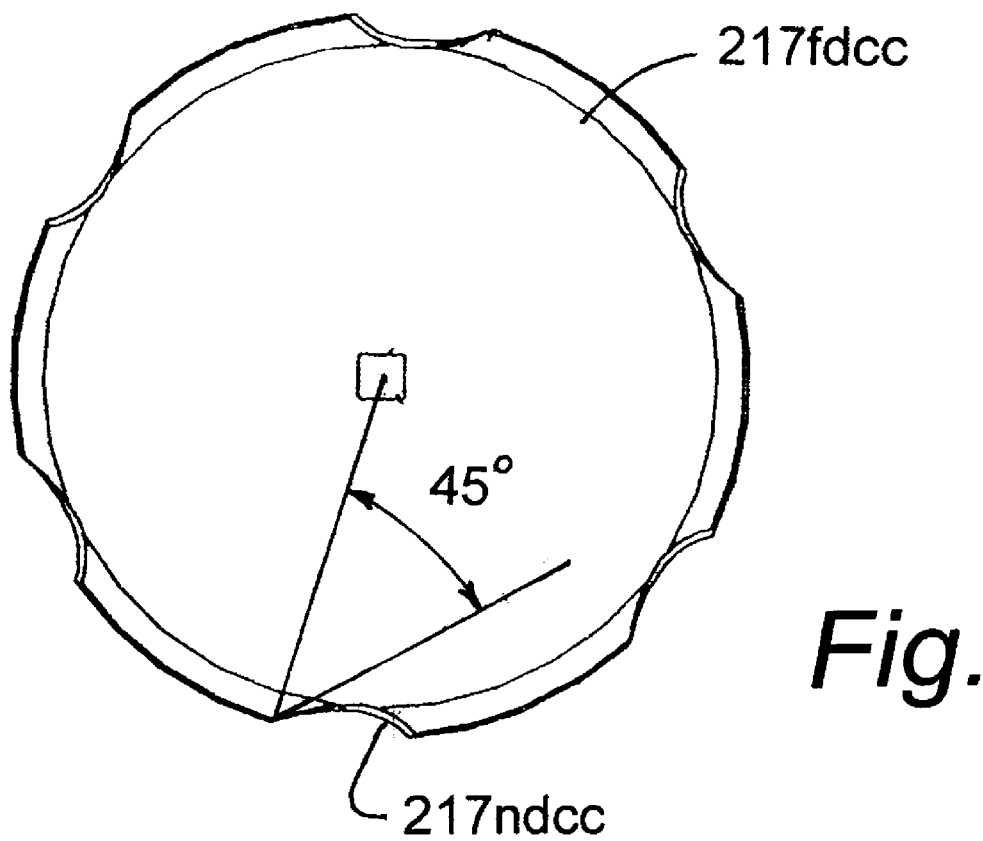

FIGS. 33-35 for making a 45 degree counterclockwise disc 217fdcc with notches 217ndcc in disc 217fdcc correspond to FIGS. 6-9 for making a 15 degree clockwise notches 17nc in disc 17f. The process is essentially the same as described for FIGS. 6-9, except the differences include the fact that the pin 19p is located in the 45 degree hole in tool 15 to the right of the zero hole 14zero, the members 21, 21a and handle 21b are pinned in hole 222c on the right side instead of on the left side and the disc 217fdcc is rotated counterclockwise from FIG. 33 when the first notch 217ndcc is cut to FIG. 34 when the second notch 217ndcc is cut to make disc 217fdcc as shown in FIG. 35.

Figure 36A:
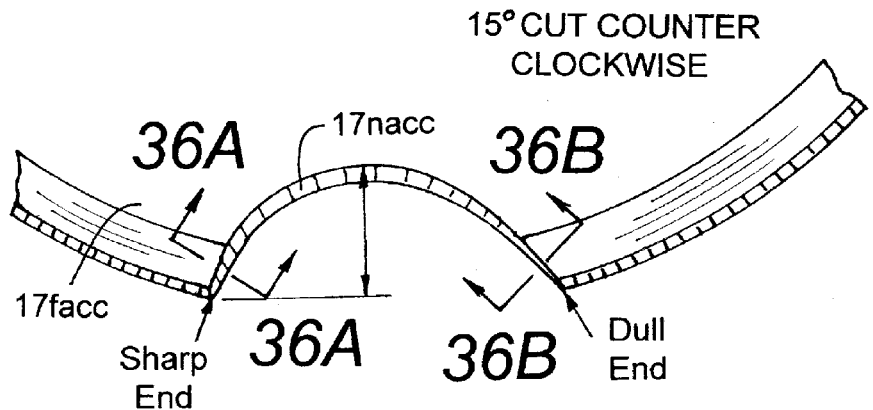
FIG. 36A is a cross sectional view taken along line 36A-36A of FIG. 36 showing a shape end of a notch.
Figure 36A:
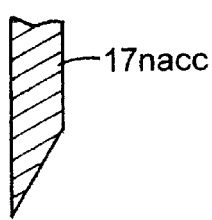
Figure 36B:
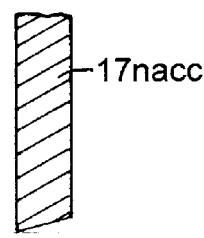
FIG. 36B is a cross sectional view taken along line 36B-36B of FIG. 36 showing a dull end of a notch.
Figure 37:
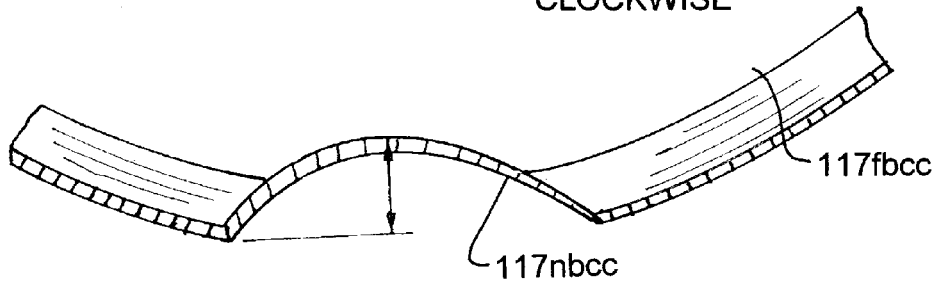
FIG. 37 is an enlarged portion of one part of a finished disc with a 30 degree counterclockwise cut.
Figure 38:
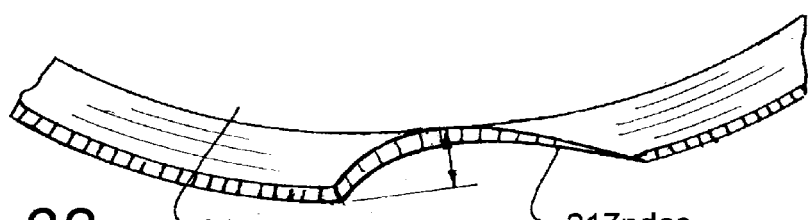
FIG. 38 is an enlarged portion of one part of a finished disc with a 45 degree counterclockwise cut.

FIGS. 36, 37 and 38 respectively show discs 17facc, 117fbcc and 217fdcc with corresponding notches 17nacc, 117nbcc and 217ndcc. As shown in FIGS. 36, 37 and 38 the dull end of each respective notch 17nacc, 117nbcc and 217ndcc is on the left and the sharp end is on the right.

FIG. 36A is a cross section taken along line 36A-36A of FIG. 36 and shows that this portion of the notch 17nacc is dull. FIG. 36B is a cross section taken along line 36B-36B of FIG. 36 and shows that this portion of the notch 17nacc is sharp. The entire notch 17ncc tapers gradually from dull to sharp from right to left as shown in FIG. 36. This is true of all of the counterclockwise cut notches shown in the figures of this document when viewed from this same perspective including, but not limited to, notches 117nbcc and 217ndcc shown in FIGS. 37 and 38.

FIG. 39 shows one of many possible uses of the present invention showing a 45 degree clockwise disc 217fdc made according to FIGS. 17-19 and 22 leading with the sharp end of the notch 217nc. In sandy soil where wheat is often grown, like places in Kansas, the disc 217f (FIG. 19) or 217fdc (FIG. 39), which can either be flat like a coulter or concave/convex like other tillage discs (FIG. 13/13A), is shown being pulled to the left as shown in FIG. 39 through the sandy soil SS. As this is done, the notch 217nc slowly gathers or captures wheat stubble WS in the notch 217nc. Leading with the sharp end of 217nc permits the disc 217f to go into the soil SS but the smaller notches prevent the disc 217f from going too deep into the soil SS. The dull end of the notch 217nc follows the sharp end and the dull end crushes the wheat stubble WS as the rear end of the notch 217nc goes into the soil SS. The smaller notch 217nc moves less soil SS as is passes through the ground. It is to be understood that one can vary the size of the notch and vary whether the dull or sharp edge of the notch is leading or following depending upon the anticipated conditions. This allows the user to control what the disc will do under the conditions present in the soil. For example a smaller notch (like a 45 degree notch) penetrates the soil less and does less aggressive tillage than a larger notch (like a 15 degree notch). Penetrating too deep during tillage in loose sandy soil will cause erosion, so the notch has to be smaller to prevent that in sandy soil.

FIG. 40 shows one of many other possible uses of a 15 degree counterclockwise disc 17facc made according to FIGS. 27-29 and 36 leading with the dull end of notch 17nacc. The disc 17facc is shown in a corn field with heavy soil HS going through corn stocks CS. This disc 17facc will do more aggressive tillage, i.e. it will go deeper into the soil and cause more displacement of the soil. A dull end of notch 17nacc leads the sharp end in this case. The dull end of the notch 17nacc releases the corn stalk residue more as it goes out of the soil HS than if the sharp end is leading. Residue R drops out better with the leading dull end of notch 17nacc and the sharp end of the notch 17nacc more easily cuts the large corn stalks CS as the notch 17nacc goes into the soil HS.

Obviously, many modifications and variations of the present invention are possible in light of the above teachings. It is therefore to be understood that, within the scope of the appended claims, the invention may be practiced otherwise than as specifically described.

I claim:

1. A method of making a notched blade comprising:
(A) providing a support surface;
(B) placing a die on one side of the support surface, the die having an arcuate supporting surface on said one side thereof, the arcuate supporting surface including an arc with a midpoint center;
(C) providing a punch having a cutting edge complementary to the arcuate supporting surface of the die, the punch having a first position on another side of the support surface and being moveable, along an operational punch line that is straight, between the first position and a second position;
(D) laying out a first straight line disposed in a first plane of the support surface, the first straight line extending from the center of the arcuate supporting surface to a first tool holder zero axis, the operational punch line being disposed at an acute angle with respect to the first plane;
(E) laying out a second straight line disposed in the first plane, the second straight line being perpendicular to the first straight line;
(F) the first tool holder zero axis being perpendicular to the first plane at a place where the first and second lines intersect;
(G) determining the size of a production circular disc to be notched, the production disc being of a predetermined radius and having a center rotational axis;
(H) placing a first pattern circular disc of the size of the production disc actually, or conceptually using engineering drawing techniques, on the tool holder for reference purposes with the center rotational axis of the first pattern circular disc being coincident with the zero axis;
(I) using a third straight line disposed in the first plane and extending through the center of the arcuate supporting surface of the disc at a predetermined angle with respect to the first straight line, the third straight line also intersecting the second straight line at a support pin axis, the support pin axis being perpendicular to the first plane;
(J) placing a support pin at the support pin axis;
(K) placing the pattern circular disc on the support surface so that the center rotational axis of the pattern circular disc is the same as the support pin axis and so that the pattern circular disc is rotatable about the support pin axis, the support pin and support pin axis being at least temporarily fixed with respect to the tool holder and spaced a predetermined distance from the die, the pattern circular disc having at least one notch of a configuration and size desired to be formed in a production circular disc;
(L) selecting one edge of the at least one notch of the pattern circular disc to be point A;
(M) selecting a point on the arcuate support surface to be point B;
(N) moving the pattern disc point A to point B in the arcuate support surface by moving the support pin and rotating the pattern disc;
(O) removing the pattern disc from the support pin;
(P) placing the production circular disc to be notched on the support surface so that the center rotational axis of the production circular disc is the same as the support pin axis and so that the production circular disc is rotatable about the support pin axis, the support pin and support pin axis being at least temporarily fixed with respect to the tool holder at such time;
(Q) while keeping the production circular disc to be notched stationary, moving the cutting surface of the punch between a first and a second position of the punch, through a first portion of the production circular disc to be notched that is at that time located between the punch and the die, thereby cutting off said first portion of the production circular disc to be notched from the remainder of the production circular disc;
(R) (i) moving the punch to the first position thereof, (ii) rotating the production circular disc to be notched about the support pin axis by a predetermined amount and again (iii) moving the punch with respect to the die from the first to the second position thereof to cut off a second portion of the production circular disc to be notched to form another notch in the production circular disc to be notched; and (S) repeating step (R) until the production circular disc has evenly spaced notches disposed around the periphery thereof.

2. The method of claim 1 additionally comprising:

bending the disc so that the disc is concave on one side and convex on the other side thereof.

3. The method of claim 1 additionally comprising:

using a locking device in a notch which has been already been cut to hold the disc from rotating while another notch is being cut.

4. The method of claim 1 additionally comprising:

sharpening the exterior periphery of the disc before any notches are cut therefrom.

* * * * *